United States Patent
Shin et al.

(10) Patent No.: US 10,082,836 B2
(45) Date of Patent: Sep. 25, 2018

(54) MOBILE TERMINAL

(71) Applicant: LG ELECTRONICS INC., Seoul (KR)

(72) Inventors: Choonghwan Shin, Seoul (KR); Byunghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/453,738

(22) Filed: Mar. 8, 2017

(65) Prior Publication Data
US 2017/0315591 A1 Nov. 2, 2017

(30) Foreign Application Priority Data

Apr. 29, 2016 (KR) .................. 10-2016-0052764

(51) Int. Cl.
*G06F 1/16* (2006.01)
*G06F 3/044* (2006.01)
*G06F 3/023* (2006.01)

(52) U.S. Cl.
CPC .......... *G06F 1/1669* (2013.01); *G06F 3/0233* (2013.01); *G06F 3/044* (2013.01); *G06F 2203/04105* (2013.01); *G06F 2203/04108* (2013.01)

(58) Field of Classification Search
CPC .................................................. G06F 1/1669
See application file for complete search history.

(56) References Cited

U.S. PATENT DOCUMENTS

| | | | | |
|---|---|---|---|---|
| 2002/0186206 A1* | 12/2002 | Lee | ........................ | G06F 1/1626 345/168 |
| 2009/0111508 A1* | 4/2009 | Yeh | ........................ | G06F 1/1624 455/552.1 |
| 2009/0264148 A1 | 10/2009 | Tom | | |
| 2011/0115712 A1* | 5/2011 | Han | ........................ | G06F 1/1626 345/169 |
| 2012/0026656 A1* | 2/2012 | Lee | ..................... | H01M 2/1066 361/679.01 |
| 2015/0109207 A1* | 4/2015 | Li | ......................... | H04M 1/23 345/158 |

FOREIGN PATENT DOCUMENTS

| KR | 10-2011-0004183 A | 1/2011 |
|---|---|---|
| KR | 10-2012-0010922 A | 2/2012 |
| KR | 10-2015-0068883 A | 6/2015 |

OTHER PUBLICATIONS

Raycat, "Review Camplus Camera Module LG G5," http://raycat.net/3603, Apr. 27, 2016, pp. 1-8.

* cited by examiner

*Primary Examiner* — Liliana Cerullo
(74) *Attorney, Agent, or Firm* — Birch, Stewart, Kolasch & Birch, LLP

(57) ABSTRACT

A mobile terminal is disclosed. The mobile terminal includes a display, a first body including a front case at a rear of the display, a rear case positioned at a rear of the front case and coupled to the front case, and an inner space positioned between the front case and the rear case and formed at an end of the first body which is opened, a second body coupled to a battery, and a controller. The second body is coupled to the first body when at least a portion of the second body and the battery are inserted into the inner space through the end of the first body, and includes at least one of a first module and a second module. The first module is connected to the first body in a direction extended from the end of the first body.

10 Claims, 24 Drawing Sheets

FIG. 16
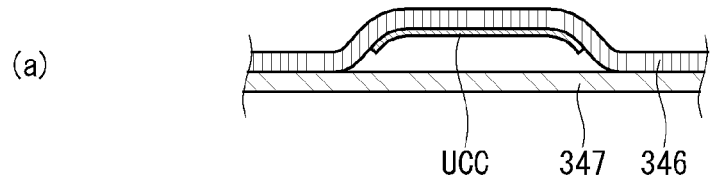
(a)
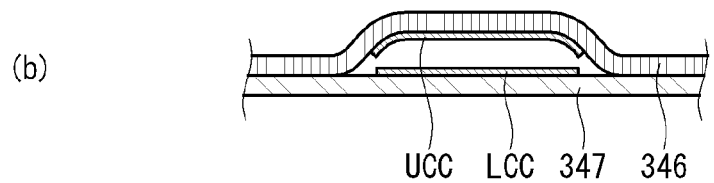
(b)
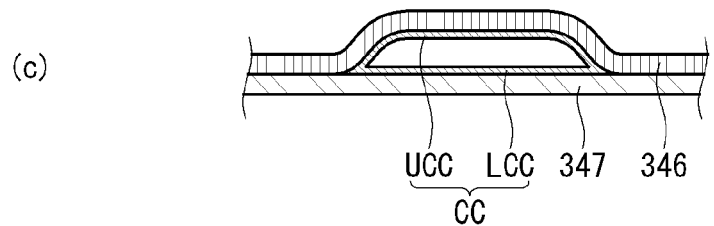
(c)

MOBILE TERMINAL

This application claims the benefit of Korean Patent Application No. 10-2016-0052764 filed on Apr. 29, 2016, the entire contents of which are incorporated herein by reference for all purposes as if fully set forth herein.

BACKGROUND OF THE INVENTION

Field of the Invention

The present disclosure relates to a mobile terminal. More particularly, the present disclosure relates to a mobile terminal including a detachable keypad unit.

Discussion of the Related Art

Terminals may be generally classified into mobile/portable terminals and stationary terminals based on a mobility. The mobile terminals may also be classified into handheld terminals and vehicle mounted terminals depending on whether or not a user can directly carry the terminal.

Mobile terminals have increasingly more functions. Examples of the functions include data and voice communications, capturing images and video using a camera, recording audio, playing music files using a speaker system, and displaying images and video on a display. Some mobile terminals include additional functionality which supports game playing, while other terminals are configured as multimedia players. More recently, the mobile terminals have been configured to receive broadcast and multicast signals which permit viewing of content such as videos and television programs.

As the mobile terminals have increasingly more functions, the mobile terminals have been implemented as multimedia players of multiple functions having capturing images and video, playing music files or video, game playing, receiving broadcast, etc.

Efforts are ongoing to support and increase the functionality of mobile terminals. Such efforts include software and hardware improvements, as well as changes and improvements in the structural components.

In recent years, there has been an increasing demand for various types of mobile terminals for design requests and/or extensions of functions.

SUMMARY OF THE INVENTION

Accordingly, an object of the present disclosure is to address the above-described and other problems.

Another aspect of the present disclosure is to provide a mobile terminal including a detachable keypad unit.

In one aspect, there is provided a mobile terminal including a display; a first body including a front case positioned at a rear of the display, a rear case positioned at a rear of the front case and coupled to the front case, and an inner space positioned between the front case and the rear case and formed at an end of the first body which is opened; a second body coupled to a battery; and a controller, wherein the second body is coupled to the first body when at least a portion of the second body and the battery are inserted into the inner space through the end of the first body, and includes at least one of a first module and a second module, wherein the first module is connected to the first body in a direction extended from the end of the first body when the second body is coupled to the first body, wherein at least a portion of the second module is overlapped with at least a portion of the display in front of the display when the second body is coupled to the first body, wherein the controller inactivates at least a portion of an overlapped area of the display overlapped with the second module when the second module is coupled to the first body, and wherein the second module includes a keypad unit having a plurality of key buttons.

The keypad unit may include a first surface on which the plurality of key buttons is positioned, and a second surface facing the display.

The keypad unit may include an impact absorbing member, wherein the impact absorbing member may be positioned on the second surface and absorbs an impact.

The keypad unit may include a second display on at least one of the first surface and the second surface.

The controller may be configured to output first contents to the display and output second contents to the second display.

The second module may include a second battery providing electric power.

The keypad unit may include a first layer positioned on a back surface of each key button and having elasticity, and a second layer positioned on a back surface of the first layer and having different electrostatic capacities depending on changes in a shape of the second layer.

The first body may include a touch sensor positioned on a back surface of the display and having an overlapped area overlapped with the second module when the second module is coupled to the first body. The controller may inactivate a portion of the touch sensor when the second module is coupled to the first body, and the portion of the touch sensor may be the outside of the overlapped area of the touch sensor.

The second body may be connected to the first body so that the keypad unit faces toward a back surface of the first body.

The second body may include at least one of an antenna module, a microphone, or a USB module.

According to at least one aspect of the present disclosure, the mobile terminal includes the keypad unit and thus can provide a physical and mechanical touch feeling for a user when the mobile terminal is used, thereby providing analog sensitivity for the user. Further, the keypad unit can be useful for a user with an uncomfortable visual acuity because the user can distinguish the key buttons of the keypad unit through his or her touch feeling.

According to at least one aspect of the present disclosure, the keypad unit is attachable to and detachable from the mobile terminal, and thus the battery can be replaced.

According to at least one aspect of the present disclosure, the present disclosure can provide the mobile terminal including the plurality of displays.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 14 to 16 illustrate a keypad unit according to an embodiment of the invention;

DETAILED DESCRIPTION OF THE EMBODIMENTS

Figure 1:
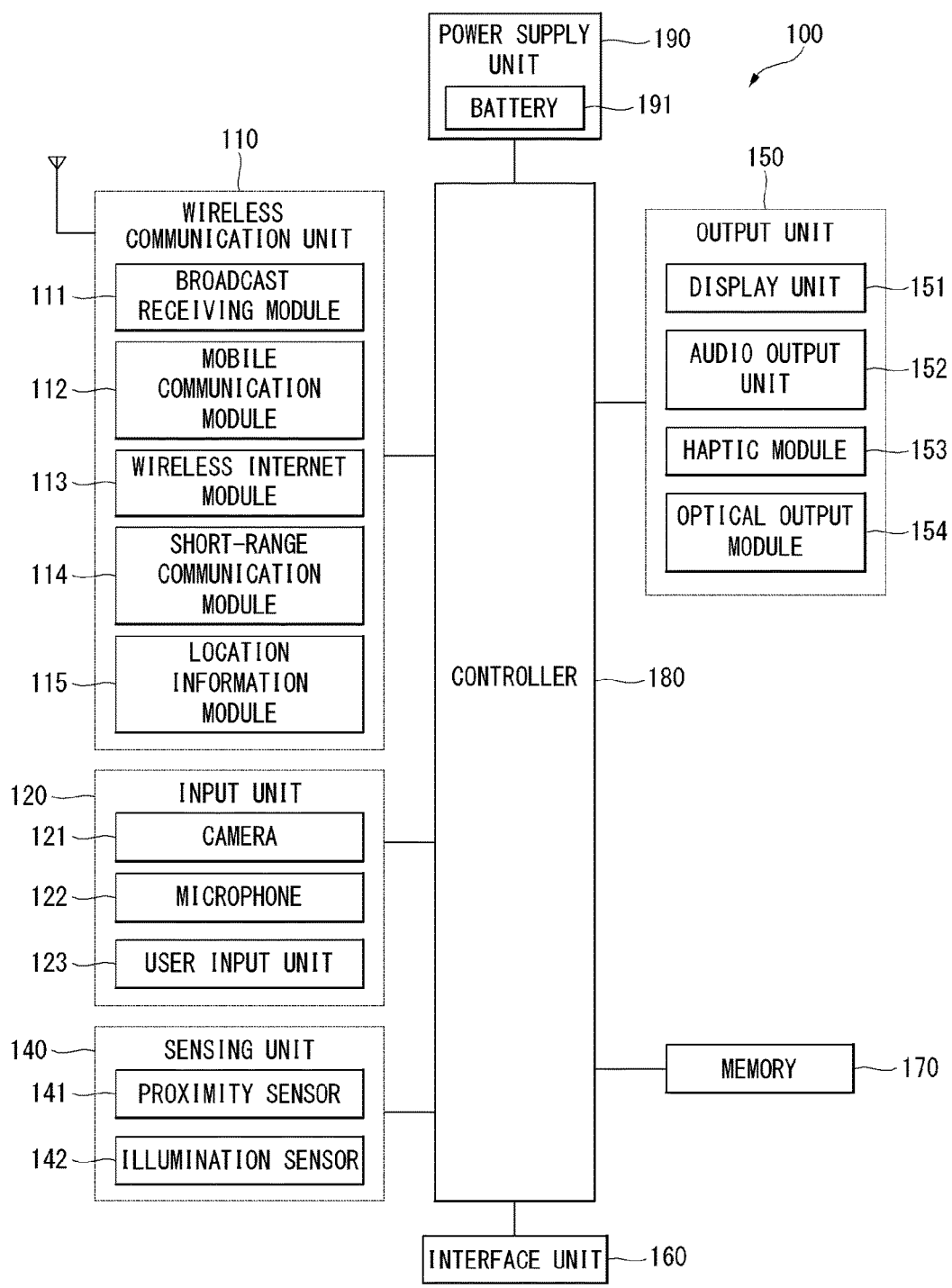
FIG. 1 is a block diagram of a mobile terminal related to an embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Mobile terminals disclosed herein may be implemented using a variety of different types of devices. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of mobile terminals, such as those types noted above. In addition, these teachings may also be applied to stationary terminals such as digital TV, desktop computers, and the like.

In embodiments disclosed herein, "display" may indicate "display unit (or display member)". Further, "display unit (or display member)" may indicate "display".

In embodiments disclosed herein, a coordinate system may be a rectangular coordinate system and may be a Cartesian coordinate system, for example, a XYZ coordinate system. In embodiments disclosed herein, the XYZ coordinate system may be a left-handed coordinate system. Namely, when fingers of a left hand are curled from the x-axis to the y-axis, a direction in which a thumb of the left hand points is the z-axis.

FIG. 1 is a block diagram of a mobile terminal related to an embodiment of the invention. A mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that more or fewer components may alternatively be implemented.

Referring now to FIG. 1, the mobile terminal 100 is shown having the wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile teiininal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output unit 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery 191, and the battery 191 may be configured to be embedded in the device body, or configured to be detachable from the device body.

At least some of the above components may be combined with one another and operate, in order to implement an operation, a control, or a control method of a mobile terminal according to various embodiments described below. Further, an operation, a control, or a control method of a mobile terminal according to various embodiments may be implemented by an execution of at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to the mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or back surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitive proximity sensor, a magnetic proximity sensor, an infrared proximity sensor, and the like. When the touch screen is implemented as a capacitive touch sensor, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes depending on an amount of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output unit 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output unit 152 can provide audible output related to a particular function (e.g., a call signal reception sound, a message reception sound, etc.) performed by the mobile terminal 100. The audio output unit 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may receive external power or provide internal power and supply the appropriate power required for operating respective elements and components included in the mobile terminal 100. The power supply unit 190 may include a battery 191, which is typically rechargeable or be detachably coupled to the device body for charging.

The power supply unit 190 may include a connection port. The connection port may be configured as one example of the interface unit 160 to which an external charger for supplying power to recharge the battery 191 is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
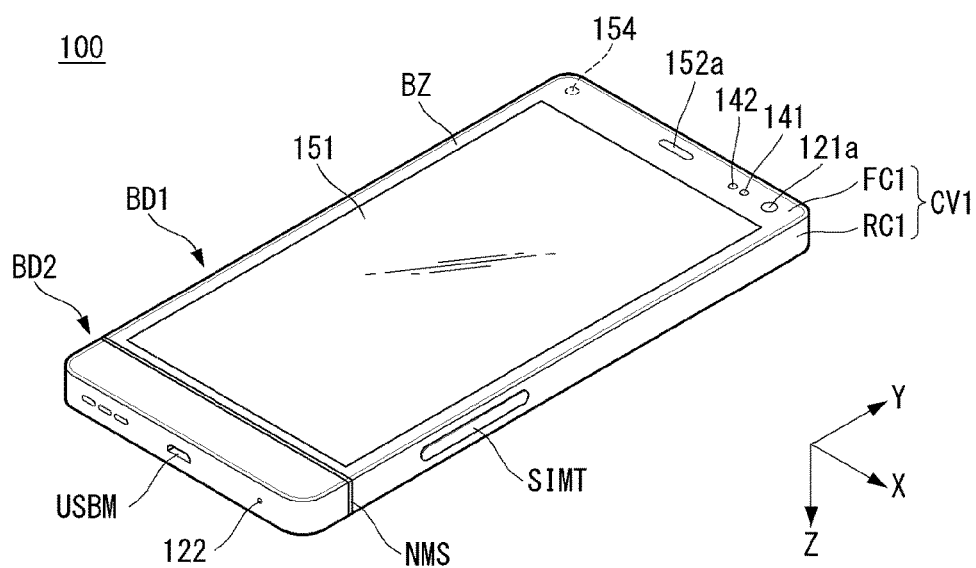
FIGS. 2 to 4 illustrate a mobile terminal of a state where a first module is coupled in accordance with an embodiment of the invention.
Figure 3:
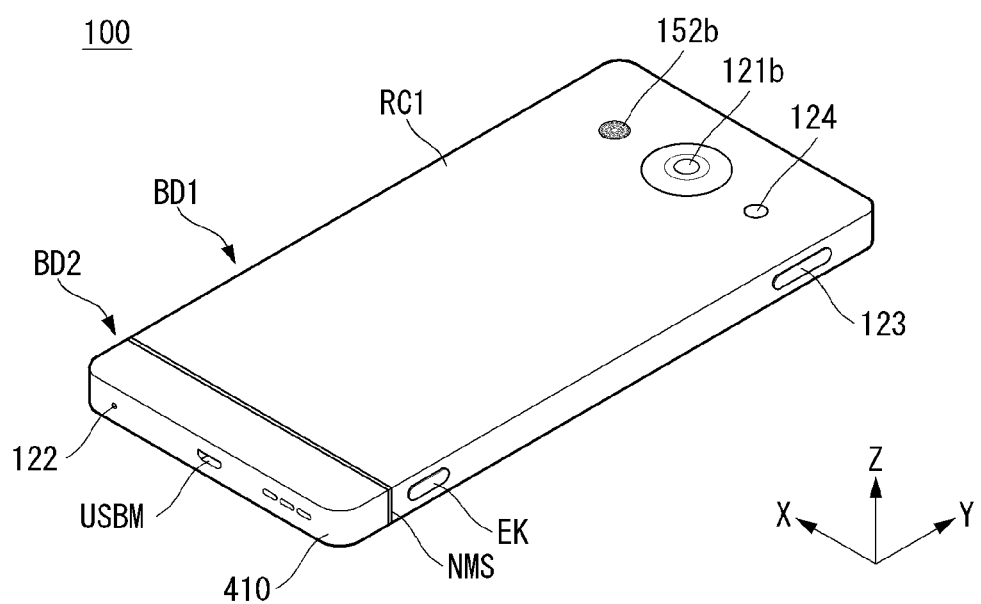
Figure 4:
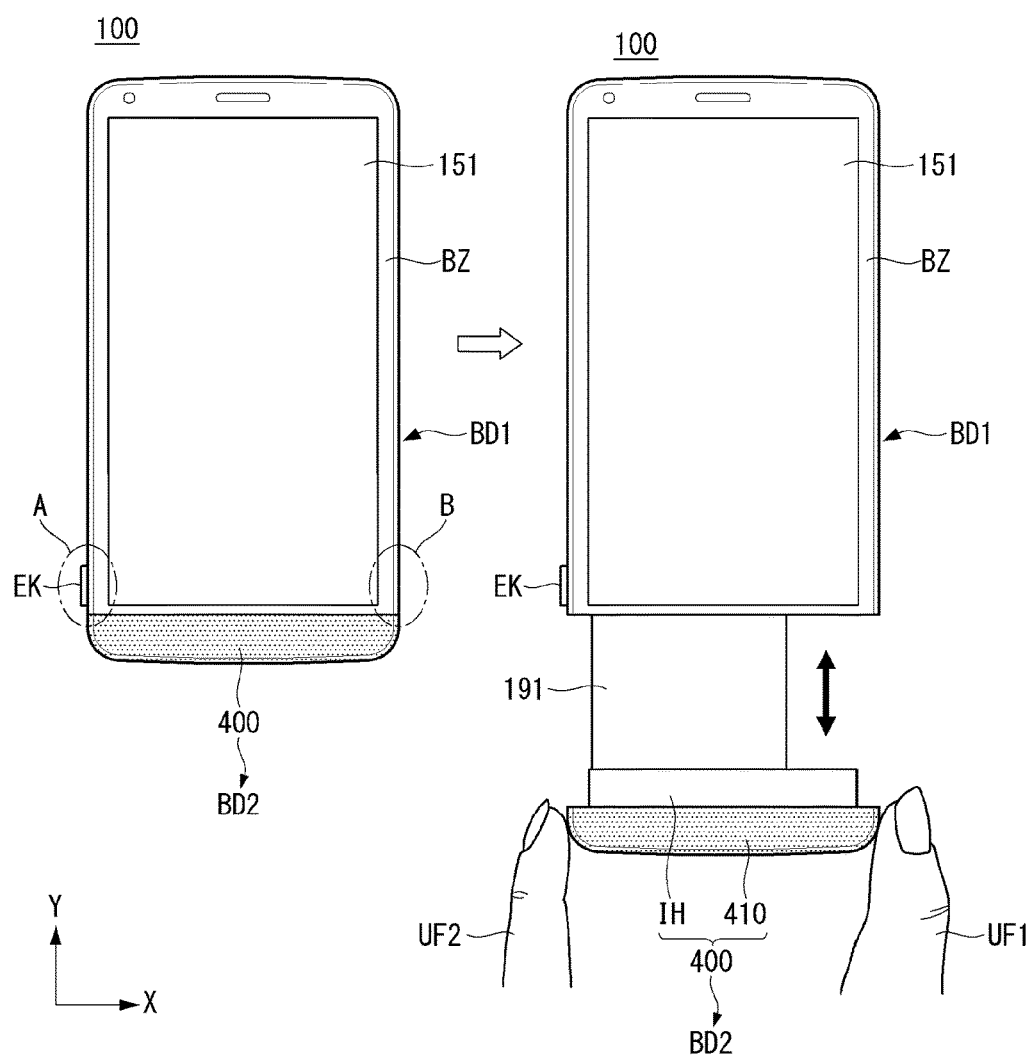

FIGS. 2 and 3 are perspective views illustrating a front surface and back surface of a mobile terminal according to an embodiment of the invention, and FIG. 4 is a front view of the mobile terminal shown in FIG. 2. As shown in FIGS. 2 to 4, the mobile terminal 100 according to the embodiment of the invention may include a first body BD1 and a second body BD2. As shown in FIG. 4, the first body BD1 and the second body BD2 may be coupled to and separated from each other.

An entire appearance of the first body BD1 may be formed by a first cover CV1. The first cover CV1 may form an inner space of the first body BD1. A side of the inner space formed by the first cover CV1 may be opened to an outer space. The first cover CV1 may include a front case FC1 and a back case RC1. The front case FC1 may form at least a portion of an appearance of a front surface of the first body BD1. The back case RC1 may form at least a portion of an appearance of a back surface and sides of the first body BD1. At least a portion of the first cover CV1 may be made of metal.

The first body BD1 may include the display unit 151, first and second audio output units 152a and 152b, the proximity sensor 141, the illumination sensor 142, the optical output module 154, first and second cameras 121a and 121b, the user input unit 123, the microphone 122, an eject key EK, a SIM tray SIMT, etc.

The SIM tray SIMT may be positioned on the side of the first body BD1 and may open and close at least a portion of the side of the first body BD1. A SIM card may be located on the SIM tray SIMT and replaced. For example, the SIM card may be USIM. When it is difficult to open the back case RC1 of the first body BD1, the SIM tray SIMT may be used to easily replace the USIM.

The display 151 may be positioned at the front surface of the first body BD1. The display 151 may include a touch sensor receiving a touch input of the display 151. A bezel BZ may be formed in a shape surrounding the display 151.

The first and second audio output units 152a and 152b may perform a function of the audio output unit 152 shown in FIG. 1. The first and second cameras 121a and 121b may perform a function of the camera 121 shown in FIG. 1. The user input unit 123 may be a touch key, a push key, or a mechanical key. The user input unit 123 may be used to power on and off the mobile terminal 100. The mobile terminal 100 may include a fingerprint recognition sensor for recognizing a fingerprint of the user. The microphone 122 may receive a voice of the user and various sounds. The optical output module 154 may output light for indicating an event generation.

The eject key EK may be positioned on the side of the first body BD1. The eject key EK may be related to the coupling and the separation between the first body BD1 and the second body BD2. As shown in FIG. 4, the user may separate the first body BD1 from the second body BD2 using his/her two fingers UF1 and UF2 by pushing the eject key EK.

The second body BD2 may include a first module 400. The first module 400 may include a first module outer portion 410 and an inner housing IH. At least a portion of the first module 400 may be inserted into an opening formed at the side of the first body BD1. For example, the inner housing IH may be inserted into a space of the first body BD1. When the first module 400 is coupled to the first body BD1, the inner housing IH may not be seen from the outside. On the other hand, when the first module 400 is coupled to the first body BD1, the first module outer portion 410 may be seen from the outside and may form an appearance of the first module 400.

At least a portion of the first module outer portion 410 may be made of metal. A non-metallic slit NMS may be formed at a boundary between the first module outer portion 410 and the first cover CV1. Radio waves or electromagnetic waves may propagate from the inside to the outside of the mobile terminal 100 or from the outside to the inside of the mobile terminal 100. The non-metallic slit NMS may be a passage or a window through which the radio waves or the electromagnetic waves propagate to the inside and the outside of the mobile terminal 100.

Figure 5:
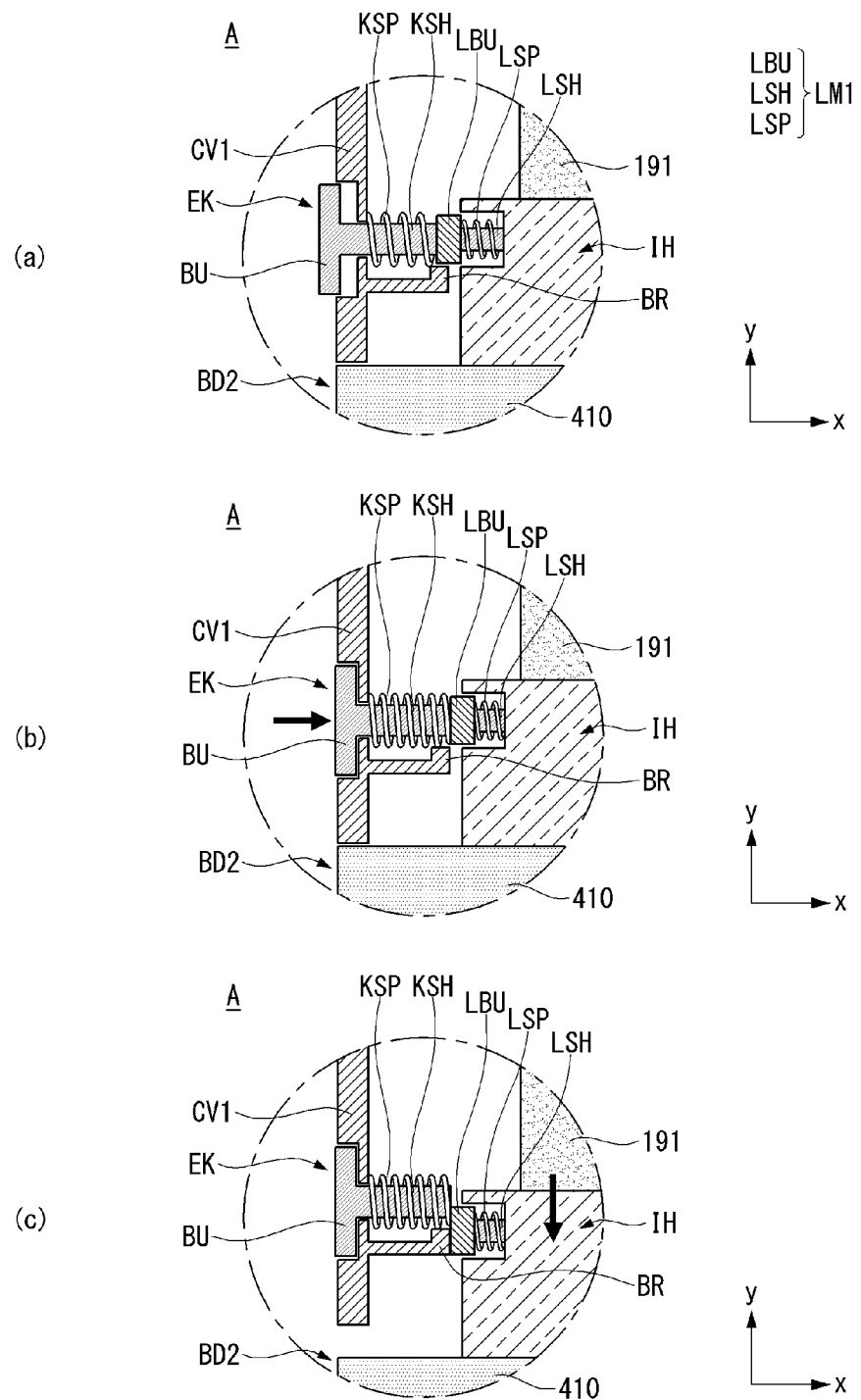
FIG. 5 illustrates a region "A" of FIG. 4.

FIG. 5 is a cross-sectional view illustrating a region "A" of FIG. 4. However, a key spring KSP and a locking spring LSP are shown as a perspective view in FIG. 5.

The eject key EK may include a button BU, a key shaft KSH, a key spring KSP, and a finger stop BR. The button BU may form a portion of the eject key EK exposed to the outside and may be connected to the key shaft KSH. The button BU may receive a force from the outside and may transfer the force to the key shaft KSH.

At least a portion of the key shaft KSH may pass through a portion of the first cover CV1. The key shaft KSH may contact a locking button LBU. The key shaft KSH may transfer a force to the locking button LBU.

One end of the key spring KSP may be connected to the first cover CV1, and the other end of the key spring KSP may be connected to the key shaft KSH. The key spring KSP may provide an elastic force for the key shaft KSH.

The finger stop BR may be connected to the first cover CV1. The finger stop BR may be positioned inside the first cover CV1 and may be in a shape extended toward the inside of the first cover CV1. The finger stop BR may contact the locking button LBU.

The inner housing IH may include a first locking module LM1. The first locking module LM1 may include a locking button LBU, a locking shaft LSH, and a locking spring LSP. The locking button LBU may adjoin the key shaft KSH. The locking button LBU may be connected to the locking shaft LSH.

The locking shaft LSH may be connected to the locking button LBU. The locking shaft LSH may receive a force from the locking button LBU or may transfer the force to the locking button LBU. Namely, the locking button LBU may transfer the force received from the key shaft KSH to the locking shaft LSH, and the locking shaft LSH may transfer the force received from the locking spring LSP to the locking button LBU.

One end of the locking spring LSP may be connected to the locking shaft LSH, and the other end of the locking spring LSP may be connected to a side of the inner housing IH. The locking spring LSP may provide an elastic force for the locking shaft LSH.

(a) of FIG. 5 illustrates that the second body BD2 is coupled to the first body BD1. The locking button LBU may overlap the finger stop BR in a direction in which the second body BD2 is separated from the first body BD1. The direction in which the second body BD2 is separated from the first body BD1 may be a negative direction of the Y-axis. The coupled state of the first body BD1 and the second body BD2 may be maintained by the action of the locking button LBU and the finger stop BR.

(b) of FIG. 5 illustrates that the button BU of the eject key EK is pushed by an external force. An arrow shown in (b) of FIG. 5 indicate a force applied from the outside. A force applied to the button BU along a direction indicated by the arrow may be transferred to the locking button LBU by the key shaft KSH. The locking button LBU may move by the transferred force.

As shown in (b) of FIG. 5, the locking button LBU may not overlap the finger stop BR in a direction in which the second body BD2 is separated from the first body BD1. When a force for separating the second body BD2 from the first body BD1 is provided for the second body BD2 in a state where the locking button LBU does not overlap the finger stop BR in a longitudinal direction of the mobile terminal 100, the second body BD2 cannot receive a mechanical coupling force from the first body BD1. For example, the force for separating the second body BD2 from the first body BD1 may be provided for the battery 191 by an elastic member formed inside the first body BD1. An elastic force provided for the battery 191 by the elastic member may be provided for the second body BD2 via the inner housing IH.

(c) of FIG. 5 illustrates that the second body BD2 is separated from the first body BD1 by the action of the eject key EK. As shown in (c) of FIG. 5, when the second body BD2 is separated from the first body BD1, the finger stop BR may be concerned in a movement of the locking button LBU in the Y-axis direction.

(a), (b), and (c) of FIG. 5 sequentially illustrate a process for separating the second body BD2 from the first body BD1. Thus, (c), (b), and (a) of FIG. 5 sequentially illustrate a process for coupling the second body BD2 to the first body BD1. When the second body BD2 is coupled to the first body BD1, the locking button LBU may have a tapered configuration in a direction toward the finger stop BR so that the locking button LBU can move along the finger stop BR.

Figure 6:
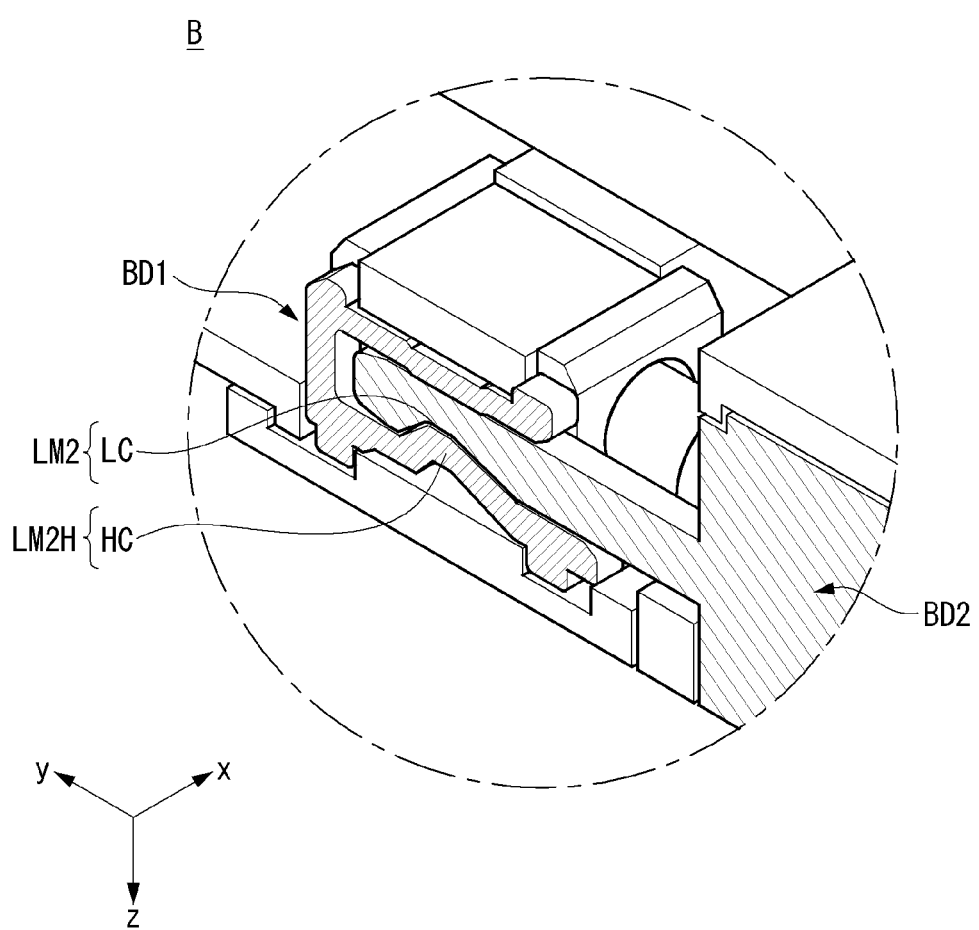
FIG. 6 illustrates a region "B" of FIG. 4.

FIG. 6 is a perspective view illustrating a region "B" of FIG. 4. The inner housing IH may include a second locking module LM2. A second locking module housing LM2H may be connected to the side of the first body BD1. The second locking module LM2 may have a locking curved portion LC. The second locking module housing LM2H may have a housing curved portion HC.

The locking curved portion LC may be positioned opposite the housing curved portion HC. A shape of the locking curved portion LC may correspond to a shape of the housing curved portion HC. For example, if the locking curved portion LC has a convex shape protruding toward the housing curved portion HC, the housing curved portion HC may have a concave shape recessed toward the locking curved portion LC.

The locking curved portion LC may have a convex shape protruding toward the housing curved portion HC. Alternatively, the locking curved portion LC may have a concave shape recessed toward the housing curved portion HC. When the locking curved portion LC has the concave shape recessed toward the housing curved portion HC, a space can be saved.

The locking curved portion LC may be inserted into the housing curved portion HC. Namely, the second locking module LM2 may be inserted into the second locking module housing LM2H. As the locking curved portion LC is inserted into the housing curved portion HC, the second body BD2 may be coupled to the first body BD1.

Figure 7:
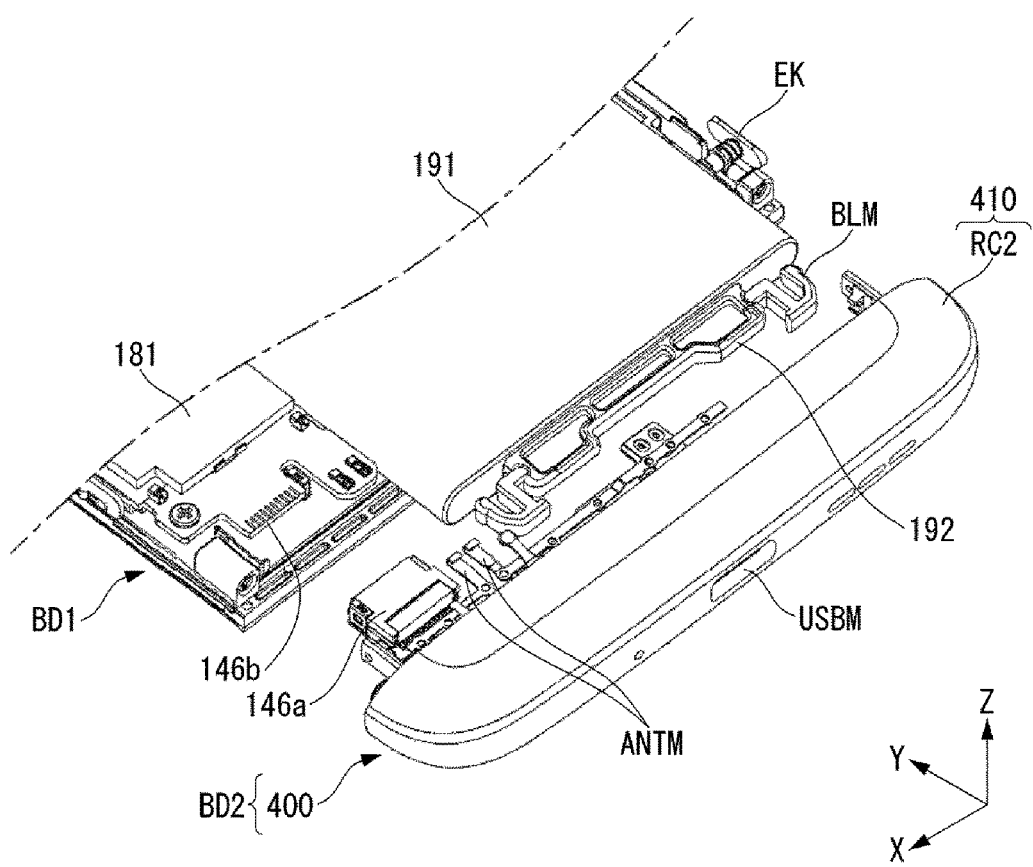
FIG. 7 illustrates that a first module is separated from a first body in accordance with an embodiment of the invention in a state where a back case is removed.

FIG. 7 is a back perspective view illustrating that the first module is separated from the first body in accordance with the embodiment of the invention in a state where the back case is removed. In FIG. 7, the first module, from which the inner housing IH is removed, is shown.

The first body BD1 may include a main circuit board 181. The main circuit board 181 may perform at least a portion of a function of the controller 180 (see FIG. 1). The main circuit board 181 may receive electric power from the battery 191.

The first body BD1 may include a connection terminal 146*b*. The connection terminal 146*b* may be electrically connected to the main circuit board 181. The connection terminal 146*b* may be electrically connected to the second body BD2 in a state where the first body BD1 and the second body BD2 are coupled to each other.

The battery 191 may go into and out of a space formed inside the first body BD1. The battery 191 may provide electric power for the mobile terminal 100. The battery 191 may be coupled to a battery coupling portion 192. The battery coupling portion 192 may form a recess and may be coupled to and/or separated from a battery locking module BLM.

The first module 400 may include a connector 146*a*, an antenna module ANTM, and an USB module USBM. The connector 146*a* may be electrically connected to the connection terminal 146*b* in a state where the first body BD1 and the second body BD2 are coupled to each other. The first module 400 may include a second back case RC2. The second back case RC2 may form a back surface of the first module outer portion 410.

Figure 8:
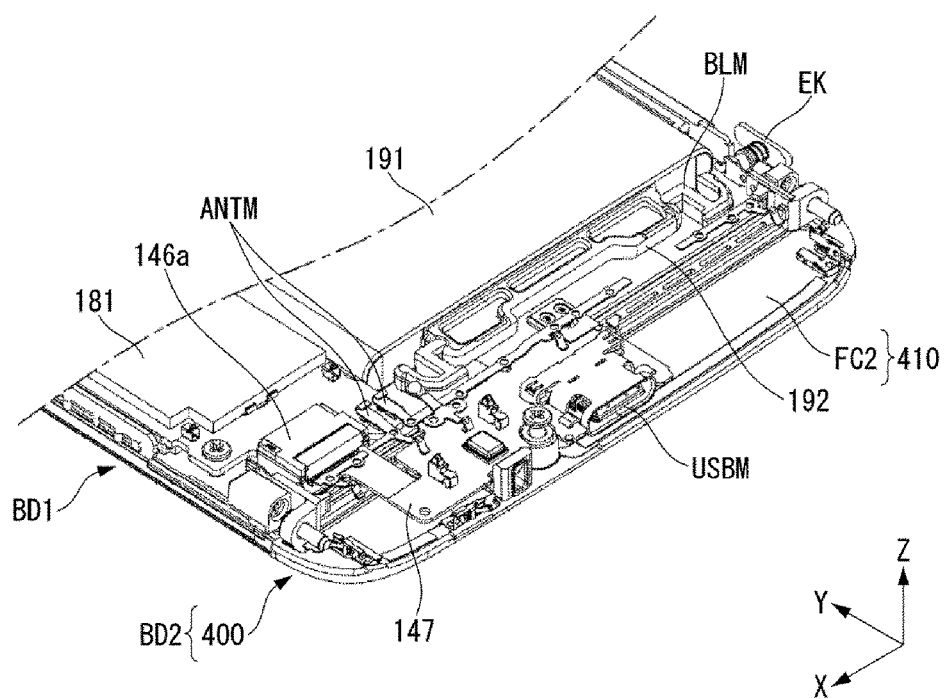
FIG. 8 is a back perspective view illustrating that a first body and a second body are coupled to each other in accordance with an embodiment of the invention in a state where a back case and a second back case are removed.

FIG. 8 is a back perspective view illustrating that the first body BD1 and the second body BD2 are coupled to each other in accordance with the embodiment of the invention in a state where the back case and the second back case are removed.

The first module 400 may include a second front case FC2. The second front case FC2 may form a front surface of the first module outer portion 410.

The first module 400 may include an auxiliary circuit board 147. The auxiliary circuit board 147 may be connected to the connector 146*a*. The auxiliary circuit board 147 may be connected to the antenna module ANTM.

The antenna module ANTM may convert an electrical signal into a radio wave or convert a radio wave into an electrical signal. A process for converting the electrical signal into the radio wave is described. The main circuit board 181 may transmit an electrical signal to the connection terminal 146*b*. The electrical signal transmitted to the connection terminal 146*b* may sequentially pass through the connection terminal 146*b* and the auxiliary circuit board 147 and may be transmitted to the antenna module ANTM. The electrical signal transmitted to the antenna module ANTM may be converted into the radio wave by the antenna module ANTM.

A process for converting a radio wave into an electrical signal and transmitting the electrical signal to the main circuit board 181 is described. The antenna module ANTM may receive the radio wave and convert the radio wave into the electrical signal. The converted electrical signal may sequentially pass through the antenna module ANTM, the auxiliary circuit board 147, the connector 146*a*, and the connection terminal 146*b* and then may be transmitted to the main circuit board 181.

The first module 400 may include the USB module USBM. The USB module USBM may be electrically connected to the auxiliary circuit board 147. Signals, that are input and output through the USB module USBM, may pass through the auxiliary circuit board 147.

Figure 9:
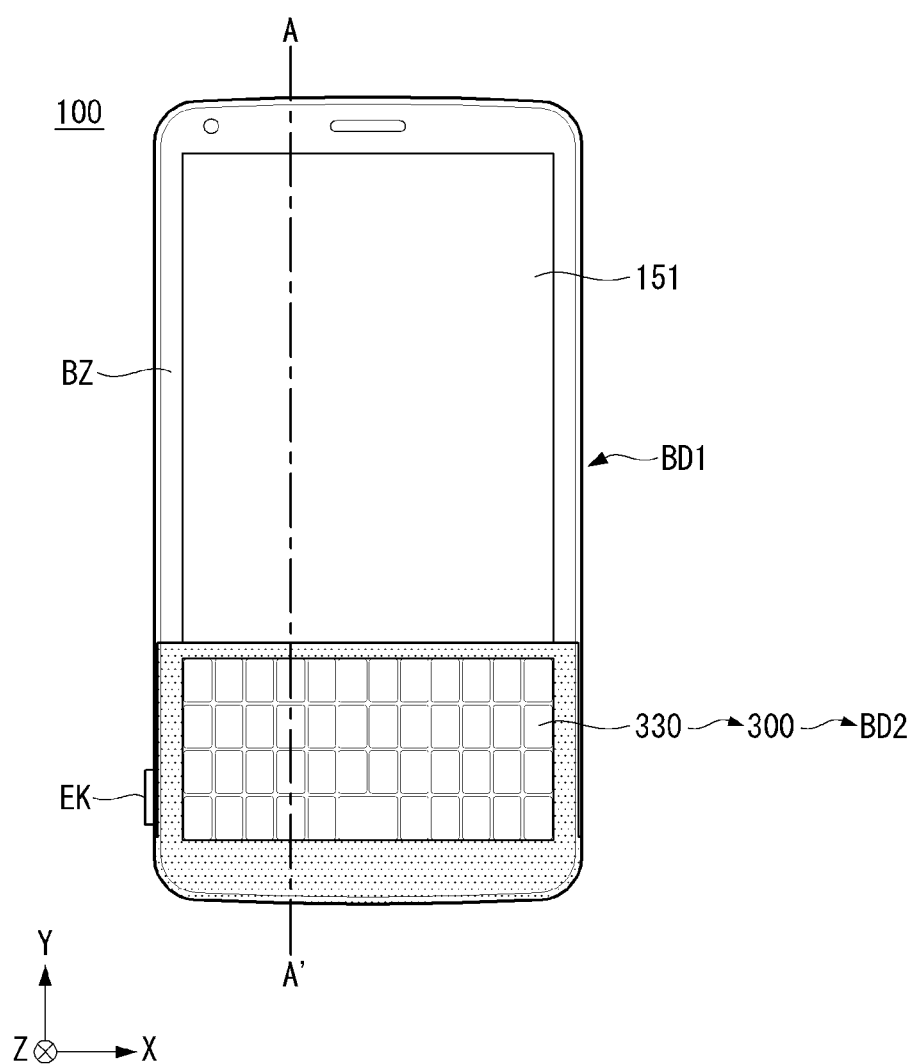
FIGS. 9 to 11 illustrate a mobile terminal, to which a second module is coupled, in accordance with an embodiment of the invention.

FIG. 9 is a front view of the mobile terminal, to which a second module is coupled, in accordance with the embodiment of the invention. More specifically, FIG. 9 is a front view of the mobile terminal 100 according to the embodiment of the invention.

As shown in FIG. 9, the mobile terminal 100 according to the embodiment of the invention may include the first body BD1 and the second body BD2. The second body BD2 may be coupled to the first body BD1. The second body BD2 is attachable to and detachable from the first body BD1. The display 151 may be positioned at the front surface of the first body BD1. The bezel BZ may be formed to surround the display 151. The second body BD2 may include a second module 300.

The longitudinal direction of the mobile terminal 100 may be a direction in which the second module 300 is connected to the first body BD1. For example, the longitudinal direction of the mobile terminal 100 may be the Y-axis direction. A lateral direction of the mobile terminal 100 may be a direction existing on the plane formed by the first body BD1. For example, the lateral direction of the mobile terminal 100 may be the X-axis direction. A front-back direction of the mobile terminal 100 may be parallel to a direction in which the display 151 is directed. For example, the front-back direction of the mobile terminal 100 may be the Z-axis direction.

The eject key EK may be positioned at one side of the first body BD1. For example, the eject key EK may be positioned at the side of the first body BD1. The eject key EK may be concerned in the coupling of the second module 300 and the first body BD1. For example, the second body BD2 may be released from the first body BD1 by pushing the eject key EK.

The second module 300 may be inserted into the inner space of the first body BD1. The inner space of the first body BD1 may be opened in a direction, in which the first body BD1 is coupled to the second body BD2. The second module 300 may be coupled to an edge of the first body BD1.

The second module 300 may be connected to one side of the first body BD1. The second module 300 may be coupled to the battery. Because the second module 300 is attachable to and detachable from the first body BD1, the battery can be replaced. The second module 300 may include a keypad unit 330.

When the second module 300 is connected to the first body BD1, the second module 300 may cover a portion of the display 151. When the second module 300 is connected to the first body BD1, the second module 300 may overlap the display 151. An overlap direction may be a direction from the back surface to the front surface of the first body BD1.

The keypad unit 330 may have a plurality of key buttons. The keypad unit 330 may receive an input from the user using the key buttons. When a user input is provided for the display 151, the user may provide a touch input for the mobile terminal 100. When the user input is provided for the keypad unit 330, the user may provide a push input for the mobile terminal 100.

The keypad unit 330 may provide a physical touch feeling for the user. The plurality of key buttons may have individual shapes. Thus, the plurality of key buttons may be distinguished from one another using a touch feeling of the user. Because the user can distinguish the key buttons without directly seeing the key buttons, it can be easy for the user to perform the touch input using the key buttons.

Figure 10:
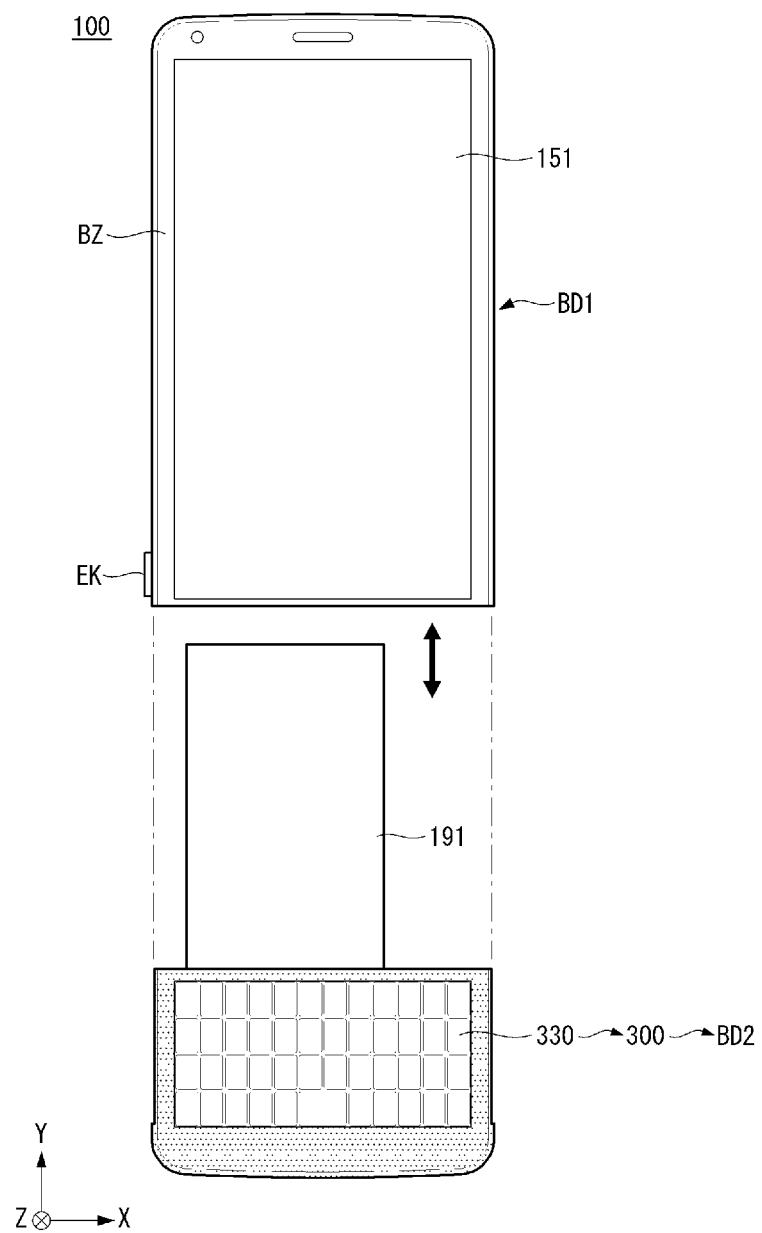

FIG. 10 illustrates that the second module 300 is separated from the first body BD1 in the mobile terminal shown in FIG. 1. In FIG. 10, the alternate long and short dashed line may indicate a path where the second module 300 is separated from the first body BD1 or coupled to the first body BD1.

The second module 300 may be separated from the first body BD1 when the eject key EK is pushed. The second body BD2 may be coupled to or separated from the battery 191 for supplying the electric power to the mobile terminal 100. As the second module 300 is coupled to or separated from the first body BD1, the battery 191 can be replaced.

The first body BD1 may be separated from the second module 300 and may be coupled to another module. When the use of the keypad unit 330 is required, the first body BD1 may be coupled to the second module 300. When the use of the keypad unit 330 is not required, the first body BD1 may be coupled to another module.

Figure 11:
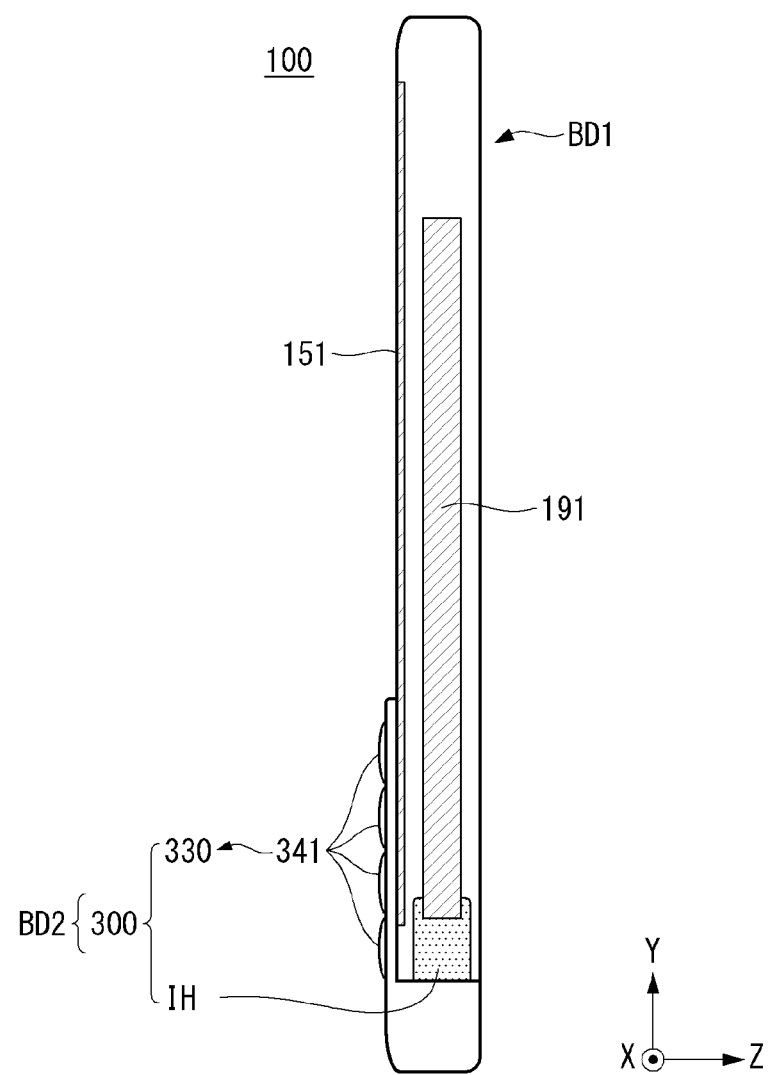

FIG. 11 is a cross-sectional view taken along line A-A' of FIG. 9. A back direction of the mobile terminal 100 or the first body BD1 may be a positive direction of the Z-axis. A front direction of the mobile terminal 100 or the first body BD1 may be a negative direction of the Z-axis.

The battery 191 may be placed inside the first body BD1 according to the embodiment of the invention. The mobile terminal 100 may receive the electric power from the battery 191. The first body BD1 may overlap the second body BD2. An overlap direction may be a direction from the front surface to the back surface of the first body BD1. The first body BD1 may accommodate the display 151 at the front surface of the first body BD1.

The display 151 may be positioned at the front surface of the first body BD1. The display 151 may overlap the second body BD2 in the Z-axis direction in a state where the second body BD2 is coupled to the first body BD1. A portion of the display 151 overlapping the second body BD2 may not be visible from the outside.

The second body BD2 may include the second module 300. The second module 300 may include the keypad unit 330. The keypad unit 330 may include a plurality of key buttons 341. The keypad unit 330 may receive a mechanical input from the user. The second module 300 may include an inner housing IH. The inner housing IH may include a battery locking module. The battery locking module may be coupled to or separated from the battery 191. The inner housing IH is attachable to and detachable from the battery 191.

Figure 12:
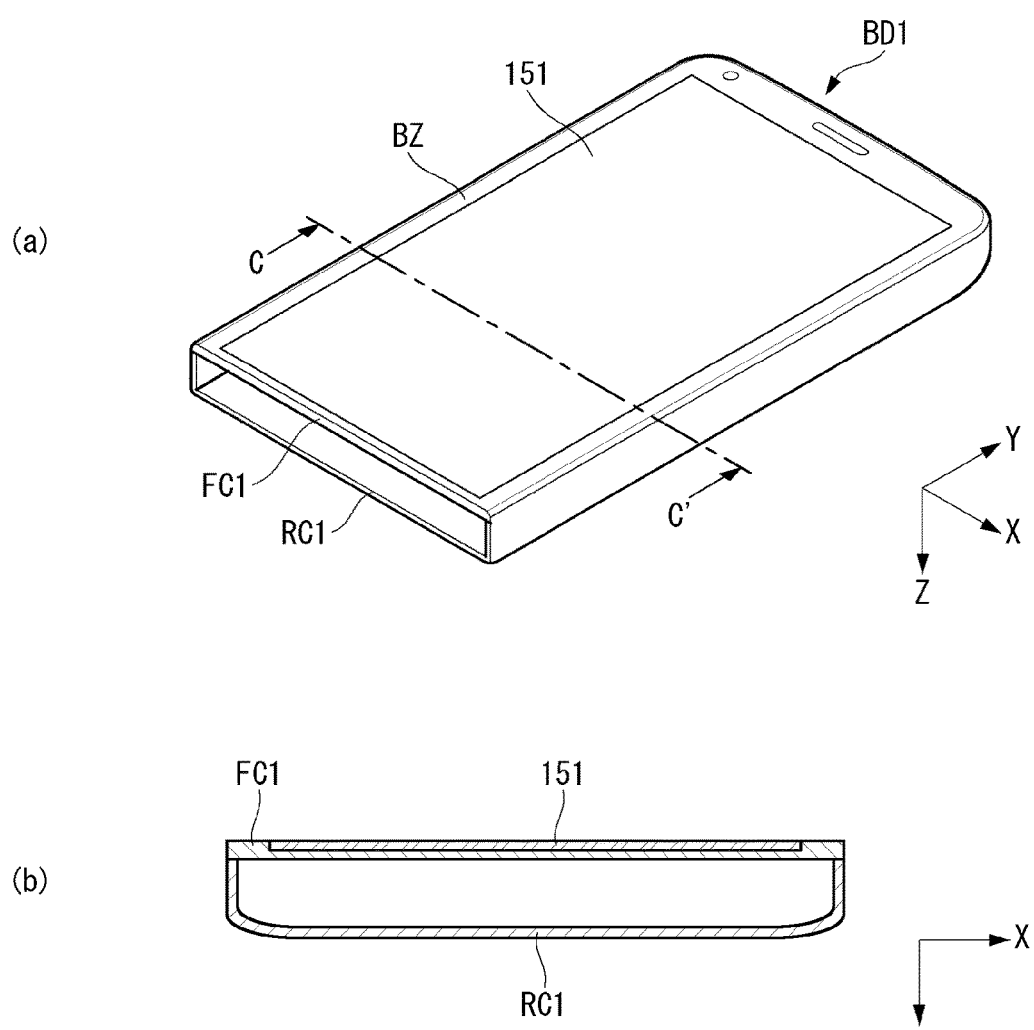
FIG. 12 illustrates a first body of a mobile terminal shown in FIG. 9.

FIG. 12 illustrates the first body of the mobile terminal shown in FIG. 9. The components disposed inside the first body BD1 are omitted in FIG. 12 for convenience of explanation. In FIG. 12, (a) is a perspective view of the first body BD1, and (b) is a cross-sectional view of the first body BD1 cut along line C-C' of (a) of FIG. 12.

The first body BD1 may include the front case FC1 and the back case RC1. The front case FC1 may form at least a portion of a shape of the front surface of the first body BD1. The back case RC1 may be extended from the front case FC1 and connected to the back surface of the first body BD1 via the side of the first body BD1. The back case RC1 may form the side and the back surface of the first body BD1. Although not shown in FIG. 12, the back case RC1 may form at least a portion of a shape of an upper surface of the first body BD1. The upper surface of the first body BD1 may indicate a surface of the first body BD1 that is seen when viewed in the negative direction of the Y-axis.

The front case FC1 may accommodate the display 151. The front case FC1 may accommodate the bezel BZ surrounding the display 151. The front case FC1 and the back case RC1 may form an inner space with one side opened.

The inner space formed by the front case FC1 and the back case RC1 may be opened downwardly. In embodiments disclosed herein, "opened downwardly" may indicate that the inner space is opened in a direction in which the first body BD1 is coupled to the second body BD2. At least a portion of the second body BD2 may be inserted into at least a portion of the inner space formed by the front case FC1 and the back case RC1. For example, at least a portion of the first module 400 or at least a portion of the second module 300 may be inserted into at least a portion of the inner space formed by the front case FC1 and the back case RC1. At least a portion of the battery 191 may be inserted into at least a portion of the inner space formed by the front case FC1 and the back case RC1.

Figure 13:
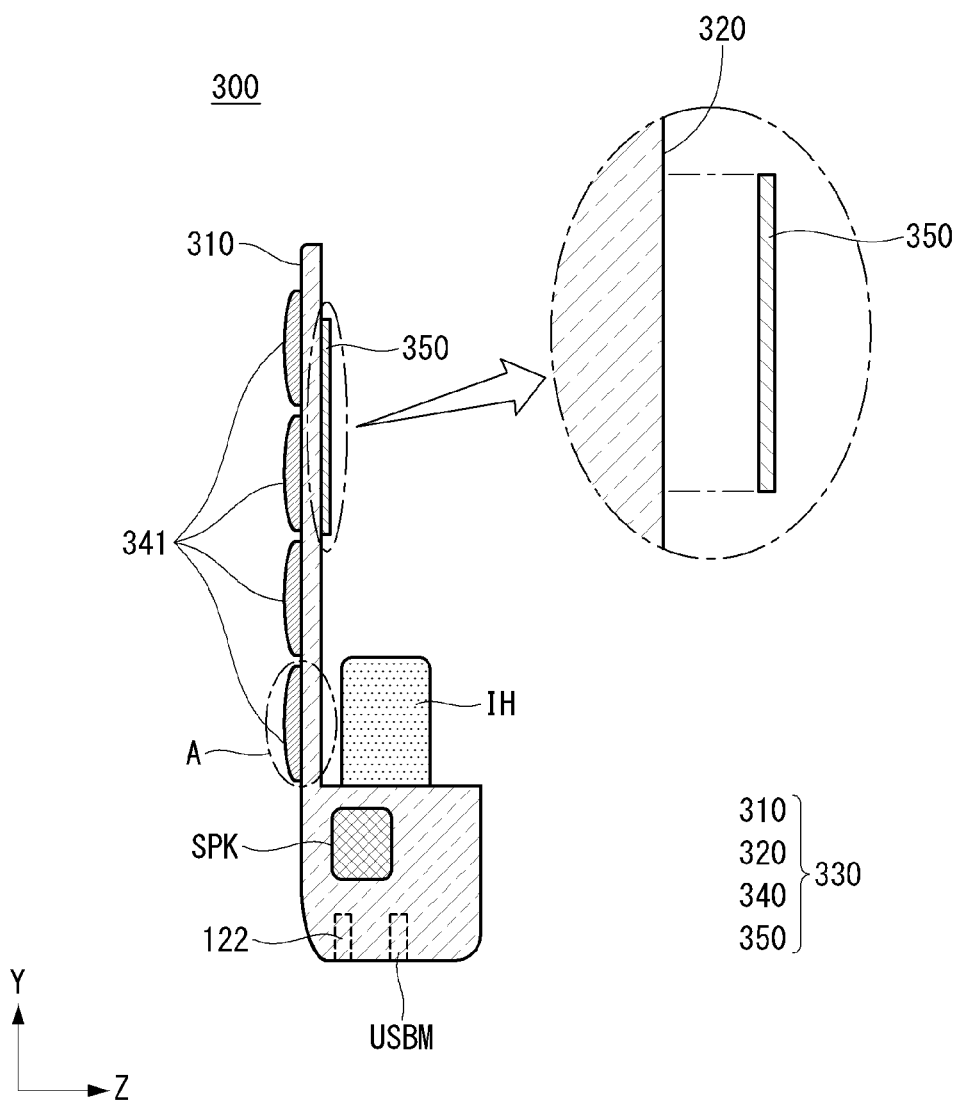
FIG. 13 illustrates in detail a second module shown in FIG. 11.

FIG. 13 illustrates in detail the second module of FIG. 11. More specifically, FIG. 13 is a side view of the second module 300 shown in FIG. 11. As shown in FIG. 13, the second module 300 may include the keypad unit 330, the inner housing IH, the speaker SPK, the microphone 122, and the USB module USBM.

The keypad unit 330 may include a first surface 310 and a second surface 320. The first surface 310 and the second surface 320 may form at least a portion of an appearance of the keypad unit 330. When the second module 300 is coupled to the first body BD1, the first surface 310 and the second surface 320 may overlap the display 151 (referring to FIG. 11) in a direction from the back surface to the front surface of the first body BD1.

The first surface 310 may be a front surface of the keypad unit 330. The first surface 310 may face toward a direction parallel to a direction in which the display 151 (referring to FIG. 11) is directed when the second module 300 is coupled to the first body BD1. A plurality of key buttons 341 may be formed on the first surface 310.

The speaker SPK may be positioned inside the second module 300. The speaker SPK may output a sound to the outside of the second module 300. The microphone 122 may be formed on one side of the second module 300. For example, the microphone 122 may be formed on a lower part of the second module 300. The USB module USBM may be formed on one side of the second module 300.

The second surface 320 may be a back surface of the keypad unit 330. The second surface 320 may face toward the display 151 (referring to FIG. 11) when the second module 300 is coupled to the first body BD1. The keypad unit 330 may include an impact absorbing member 350. The impact absorbing member 350 may be positioned on the second surface 320. The impact absorbing member 350 may be adjacent to the display 151 (referring to FIG. 11) or in contact with the display 151 (referring to FIG. 11) when the second module 300 is coupled to the first body BD1. The impact absorbing member 350 can prevent or reduce an impact applied to the key button 341 from being transferred to the display 151 (referring to FIG. 11). At least a portion of the impact absorbing member 350 may be made of a material with the elasticity. The impact absorbing member 350 may be positioned between the second surface 320 and the display 151 (referring to FIG. 11) when the second module 300 is coupled to the first body BD1.

The inner housing IH may include a battery locking module BLM (referring to FIG. 11) coupled to the battery 191. The inner housing IH may be located in the inner space of the first body BD1 when the second module 300 is coupled to the first body BD1.

Although not shown in FIG. 13, the second module 300 may include the connector 146a, the auxiliary circuit board 147, and the antenna module ANTM shown in FIG. 8. The connector 146a and the antenna module ANTM may be electrically connected to the auxiliary circuit board 147.

Figure 14:
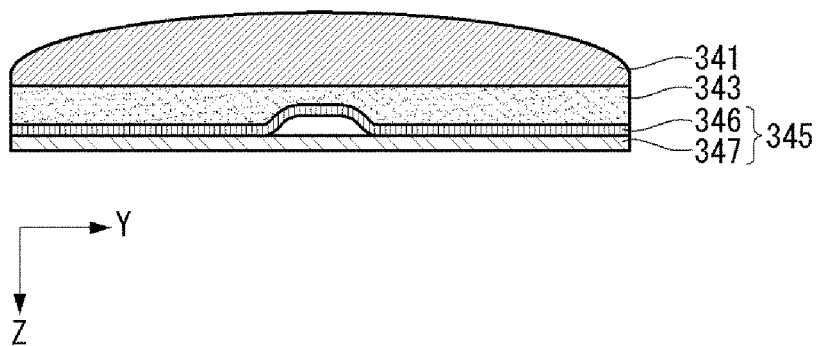
Figure 15:
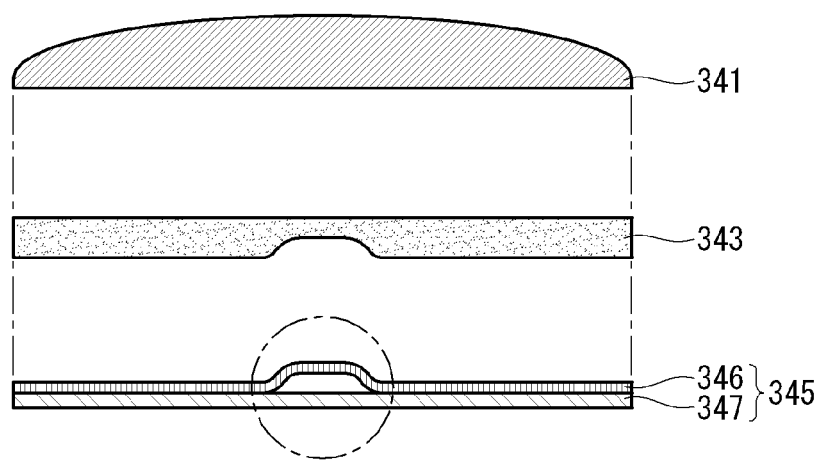

FIGS. 14 to 16 illustrate the keypad unit according to the embodiment of the invention. More specifically, FIG. 14 illustrates a portion A of FIG. 13, and FIG. 15 is an exploded view of the keypad unit shown in FIG. 14. For example, a portion of the keypad unit 330 may be configured such that the key button 341, a first layer 343, and a second layer 345 are sequentially stacked. The keypad unit 330 may include the key button 341, the first layer 343, and the second layer 345.

The key button 341 may face toward the outside. The key button 341 may face toward the front surface of the second module 300. The key button 341 may form an appearance of the second module 300. The key button 341 may face toward the front surface of the mobile terminal 100 (referring to FIG. 11) when the second module 300 (referring to FIG. 11) is coupled to the first body BD1 (referring to FIG. 11).

The second layer 345 may form at least a portion of the second surface 320 of the keypad unit 330. The second layer 345 may have a measurable physical quantity. For example, the second layer 345 may have an electrostatic capacity. As another example, the second layer 345 may have a capacitance. The electrostatic capacity and the capacitance are measurable. The second layer 345 may have a hollow portion therein. The second layer 345 may have different electrostatic capacities depending on changes in a shape of the second layer 345.

The second layer 345 may be configured as a plurality of layers. As shown in FIG. 15, the second layer 345 may include a second upper layer 346 and a second lower layer 347. The second upper layer 346 and the second lower layer 347 may be stacked. The second upper layer 346 may be adjacent to the first layer 343. The second lower layer 347 may form at least a portion of the second surface 320. An inner space may be formed between the second upper layer 346 and the second lower layer 347. The second upper layer 346 and the second lower layer 347 may be formed as one body.

The second layer 345 may be adjacent to the display 151 (referring to FIG. 11) and may contact the display 151 (referring to FIG. 11). The second layer 345 may transfer a change in the electrostatic capacity to the display 151 (referring to FIG. 11). A touch sensor 143 (referring to FIG. 19) may be positioned on the back surface of the display 151 (referring to FIG. 11) and may obtain a touch input of the user. The second layer 345 may transfer changes in the electrostatic capacity to the touch sensor 143 (referring to FIG. 11).

The first layer 343 may be positioned between the key button 341 and the second layer 345. The first layer 343 may have elasticity. The first layer 343 may transfer a push input applied to the key button 341 to the second layer 345.

A shape of the inner space formed in the second layer 345 may be changed by a force or a pressure applied to the second layer 345. The shape of the inner space formed in the second layer 345 may be restored when the force or the pressure applied to the second layer 345 is removed. The controller 180 may measure a capacitance that varies depending on changes in the shape of the second layer 345.

FIG. 16 illustrates various examples of the second layer. The second layer 345 may include a carbon coating CC. The carbon coating CC may be formed inside the second layer 345. The carbon coating CC may be formed in the hollow portion formed inside the second layer 345. The carbon coating CC may include an upper carbon coating UCC formed on the second upper layer 346 and a lower carbon coating LCC formed on the second lower layer 347.

When a force or a pressure is applied to the second layer 345, a shape of the hollow portion formed inside the second layer 345 may be changed. When the shape of the hollow portion is changed, the shape of the carbon coating CC may be changed. Thus, an electrostatic capacity formed by the carbon coating CC may change. The change in the electrostatic capacity may be sensed by the touch sensor 143.

As shown in (a) of FIG. 16, the second layer 345 may include an upper carbon coating UCC formed in the hollow portion. As shown in (b) of FIG. 16, the second layer 345 may include an upper carbon coating UCC and a lower carbon coating LCC formed in the hollow portion. The upper carbon coating UCC and the lower carbon coating LCC may be spaced apart from each other. As shown in (c) of FIG. 16, the second layer 345 may include an upper carbon coating UCC and a lower carbon coating LCC connected to the upper carbon coating UCC.

Figure 17:
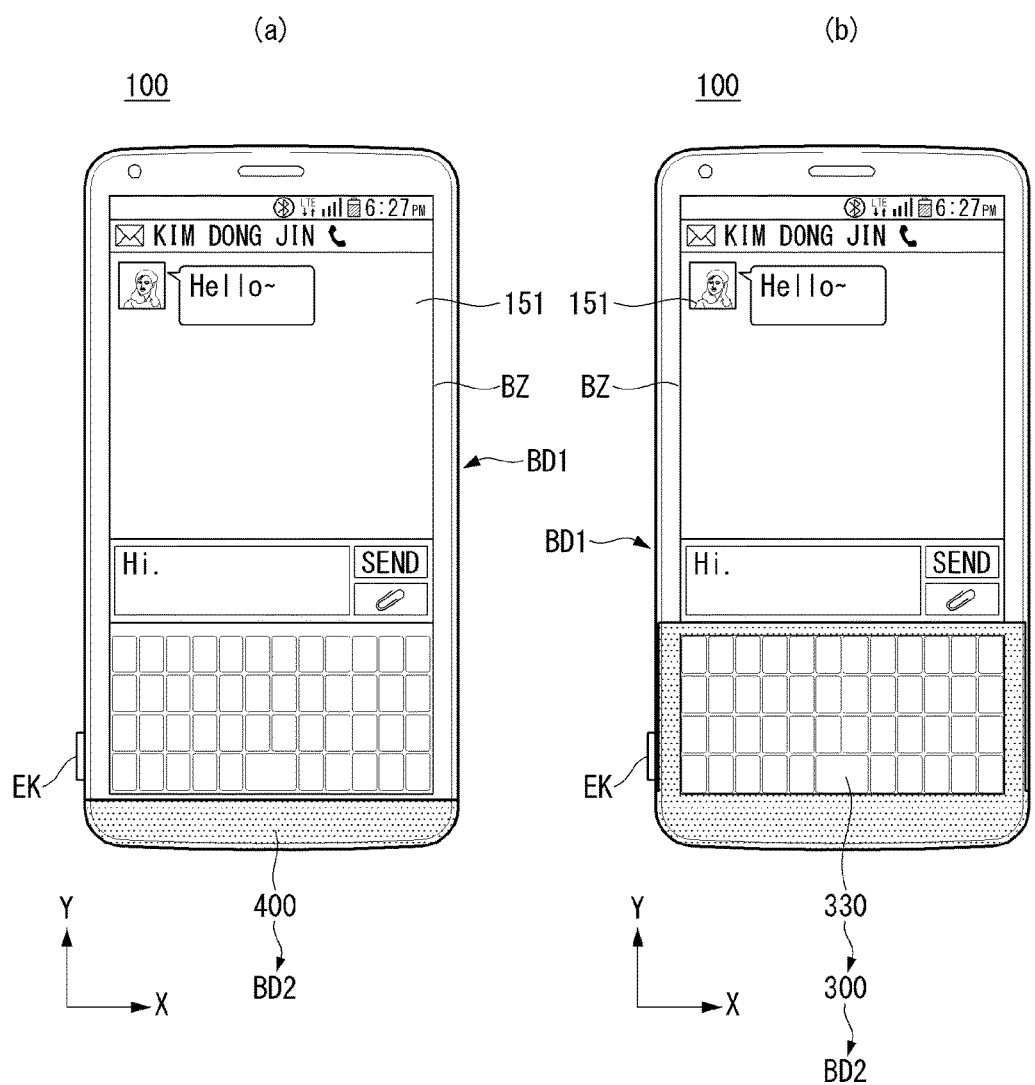
FIG. 17 illustrates a comparison between a mobile terminal, to which a first module is coupled, and a mobile terminal, to which a second module is coupled, in accordance with an embodiment of the invention.

FIG. 17 illustrates a difference between the mobile terminal, to which the first module is coupled, and the mobile terminal, to which the second module is coupled, in accordance with the embodiment of the invention. More specifically, FIG. 17 illustrates a situation in which the user sends a text message (SMS) of "Hi" after receiving a text message (SMS) of "Hello".

In FIG. 17, (a) illustrates the mobile terminal 100, in which the first module 400 is coupled to the first body BD1. The user may write a text message using input keys on a portion of the display 151 implemented when the first module 400 is coupled to the first body BD1.

In FIG. 17, (b) illustrates the mobile terminal 100, in which the second module 300 is coupled to the first body BD1. The user may write a text message using the keypad unit 330 when the second module 300 is coupled to the first body BD1. A portion of the display 151 covered by the keypad unit 330 shown in (b) of FIG. 17 may be substantially the same as a formation portion of the input keys implemented on a portion of the display 151 shown in (a) of FIG. 17.

A portion of the display 151 covered by the keypad unit 330 may not be activated. A portion of the display 151 covered by the keypad unit 330 may be inactivated. An inactivated portion of the display 151 may overlap the portion of the display 151 covered by the keypad unit 330. The inactivated portion of the display 151 may include the portion of the display 151 covered by the keypad unit 330. The inactivated portion of the display 151 may be included in the portion of the display 151 covered by the keypad unit 330. Because the display 151 has the inactivated portion, power consumption of the mobile terminal 100 can be reduced.

Figure 18:
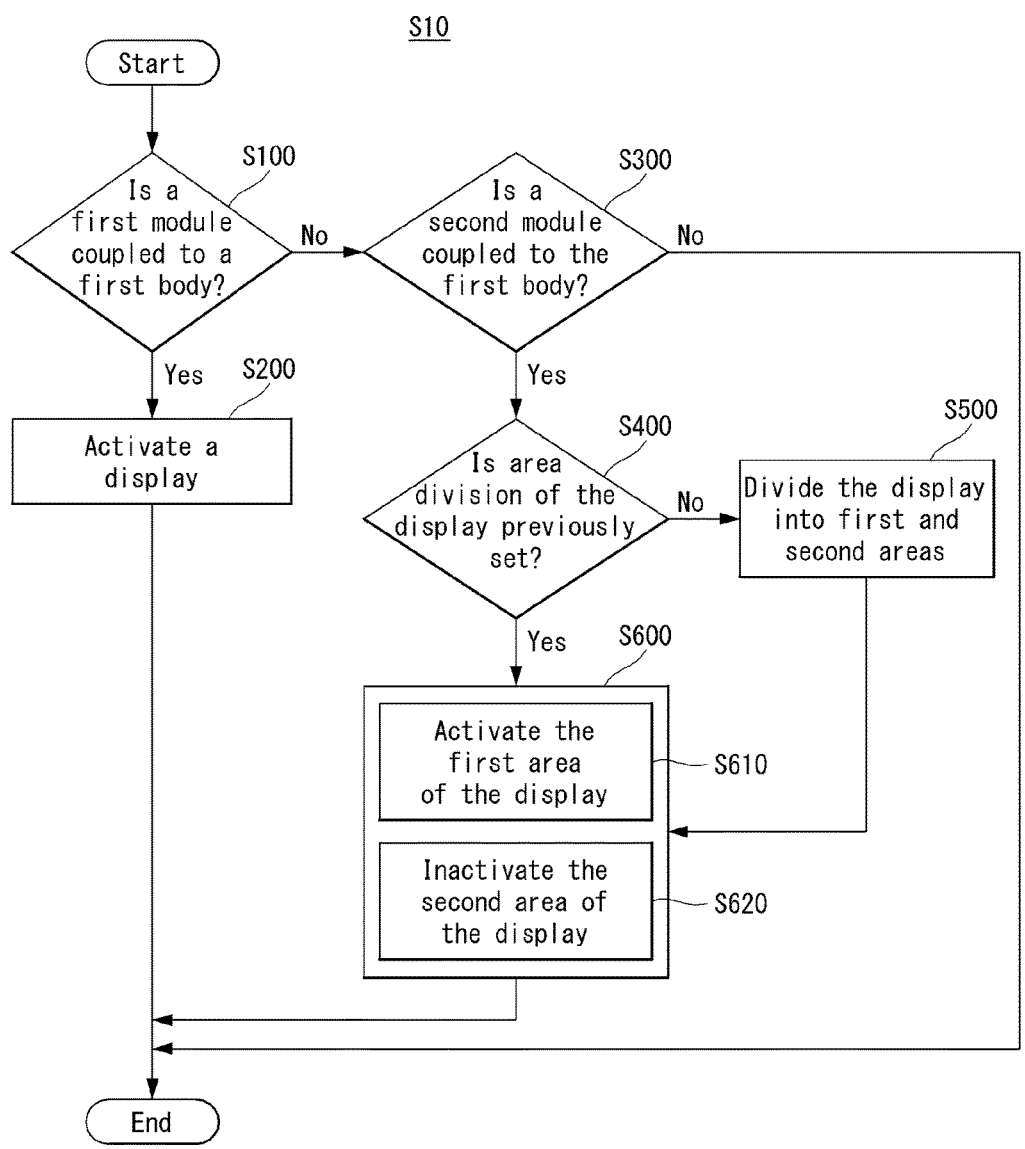
FIG. 18 is a flow chart illustrating a method for activating a display according to an embodiment of the invention.

FIG. 18 is a flow chart illustrating a method for activating the display according to the embodiment of the invention. When the second module 300 is coupled to the first body BD1, a portion of the display 151 may be inactivated. When the first module 400 is coupled to the first body BD1, an entire portion of the display 151 may be activated.

A method S10 for activating the display 151 according to the embodiment of the invention may include a step S100 of determining whether or not the first module 400 is coupled to the first body BD1. In the step S100, the controller 180 may determine whether or not the first module 400 is coupled to the first body BD1.

The method S10 for activating the display 151 according to the embodiment of the invention may include a step S200 of activating the display 151. When it is determined that the first module 400 is coupled to the first body BD1, the controller 180 may activate the entire display 151.

The method S10 for activating the display 151 according to the embodiment of the invention may include a step S300 of determining whether or not the second module 300 is coupled to the first body BD1. When it is determined that the first module 400 is not coupled to the first body BD1, it may be necessary to determine whether or not the second module 300 is coupled to the first body BD1. In the step S300, the controller 180 may determine whether or not the second module 300 is coupled to the first body BD1. When it is determined that the second module 300 is coupled to the first body BD1, the display 151 needs to be divided into a first area to be activated and a second area to be inactivated.

The method S10 for activating the display 151 according to the embodiment of the invention may include a step S400 of determining whether or not an area division of the display 151 is previously set. In the step S400, the controller 180 may determine whether or not the display 151 has been already divided into the first and second areas.

The method S10 for activating the display 151 according to the embodiment of the invention may include a step S500 of dividing the display 151 into the first area and the second area. When the display 151 is in a state where it is not divided into the first area and the second area, the controller 180 may divide the display 151 into the first area and the second area.

The method S10 for activating the display 151 according to the embodiment of the invention may include a step S600 of heterogeneously activating the display 151. The heterogeneous activation of the display 151 may indicate activating a portion of the display 151. The heterogeneous activation step S600 of the display 151 may include a step S610 of activating the first area of the display 151 and a step S620 of inactivating the second area of the display 151. In the step S610, the controller 180 may activate the first area of the display 151. In the step S620, the controller 180 may inactivate the second area of the display 151.

Figure 19:
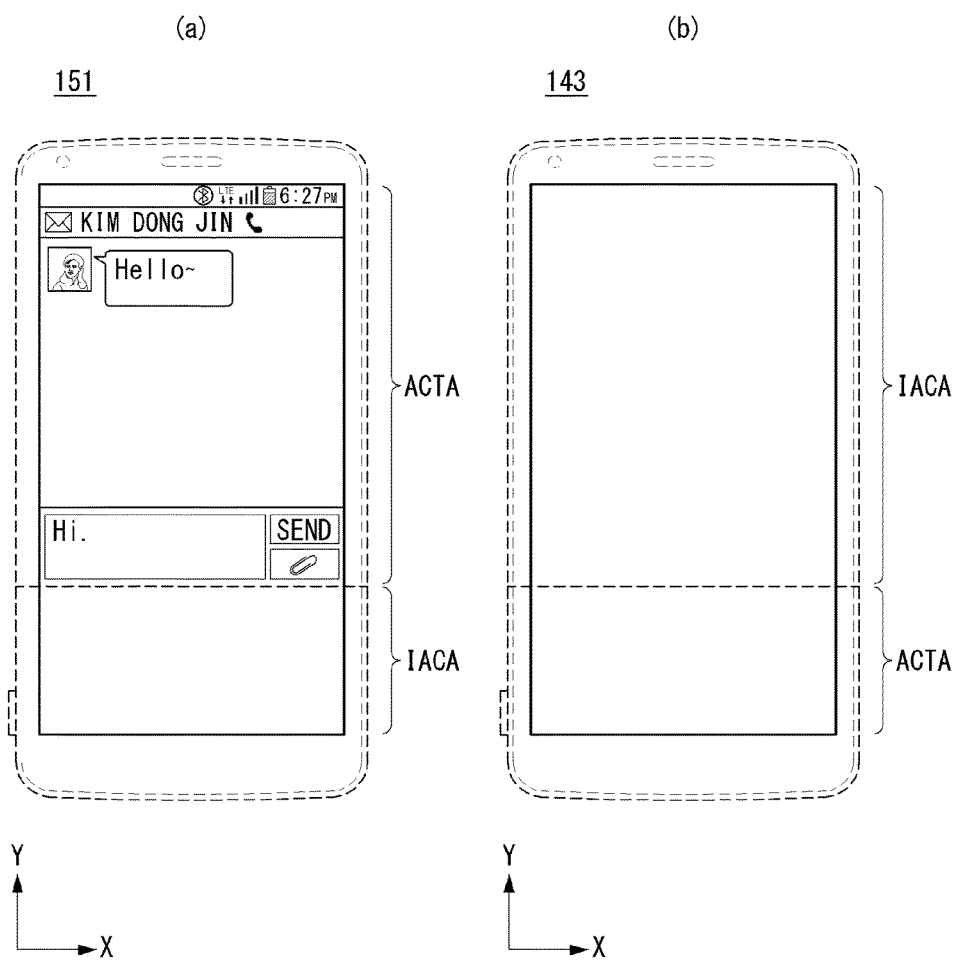
FIG. 19 illustrates a display and a touch sensor of a mobile terminal, to which a second module is coupled, in accordance with an embodiment of the invention.

FIG. 19 illustrates the display and the touch sensor of the mobile terminal, to which the second module is coupled, in accordance with the embodiment of the invention. More specifically, (a) of FIG. 19 illustrates the display 151 shown in (b) of FIG. 17, and (b) of FIG. 19 illustrates the touch sensor 143 shown in (b) of FIG. 17.

As shown in (a) of FIG. 19, when the second module 300 is coupled to the first body BD1, the display 151 may include an activation area ACTA and an inactivation area IACA. The activation area ACTA may indicate an area of the display 151 activated by the controller 180. The inactivation area IACA may indicate an area of the display 151 inactivated by the controller 180.

The inactivation area IACA of the display 151 may overlap a portion of the display 151 overlapping the second module 300. The inactivation area IACA may include an overlap portion of the display 151 and the second module 300.

The inactivation area IACA of the display 151 may indicate the second area shown in FIG. 18. The activation area ACTA of the display 151 may indicate the first area shown in FIG. 18. The inactivation area IACA cannot receive contents from the controller 180. The inactivation area IACA cannot receive the electrical signal from the controller 180. The inactivation area IACA cannot receive the electric power from the controller 180.

The activation area ACTA of the display 151 may indicate the first area shown in FIG. 18. The activation area ACTA may receive the electric power and the electrical signal from the controller 180.

As shown in (b) of FIG. 19, when the second module 300 is coupled to the first body BD1, the touch sensor 143 may include an activation area ACTA and an inactivation area IACA. The activation area ACTA of the touch sensor 143 may indicate an area of the touch sensor 143 activated by the controller 180. The activation area ACTA of the touch sensor 143 may overlap the inactivation area IACA of the display 151. In other words, the activation area ACTA of the touch sensor 143 may be the inactivation area IACA of the display 151.

The inactivation area IACA of the touch sensor 143 may indicate an area of the touch sensor 143 inactivated by the controller 180. The inactivation area IACA of the touch sensor 143 may overlap the activation area ACTA of the display 151. In other words, the inactivation area IACA of the touch sensor 143 may be the activation area ACTA of the display 151. Because the activation area ACTA of the display 151 is the same as or overlaps the inactivation area IACA of the touch sensor 143, the user input may be obtained only through the keypad unit 330. Hence, the user's input error can be prevented or reduced.

Figure 20:
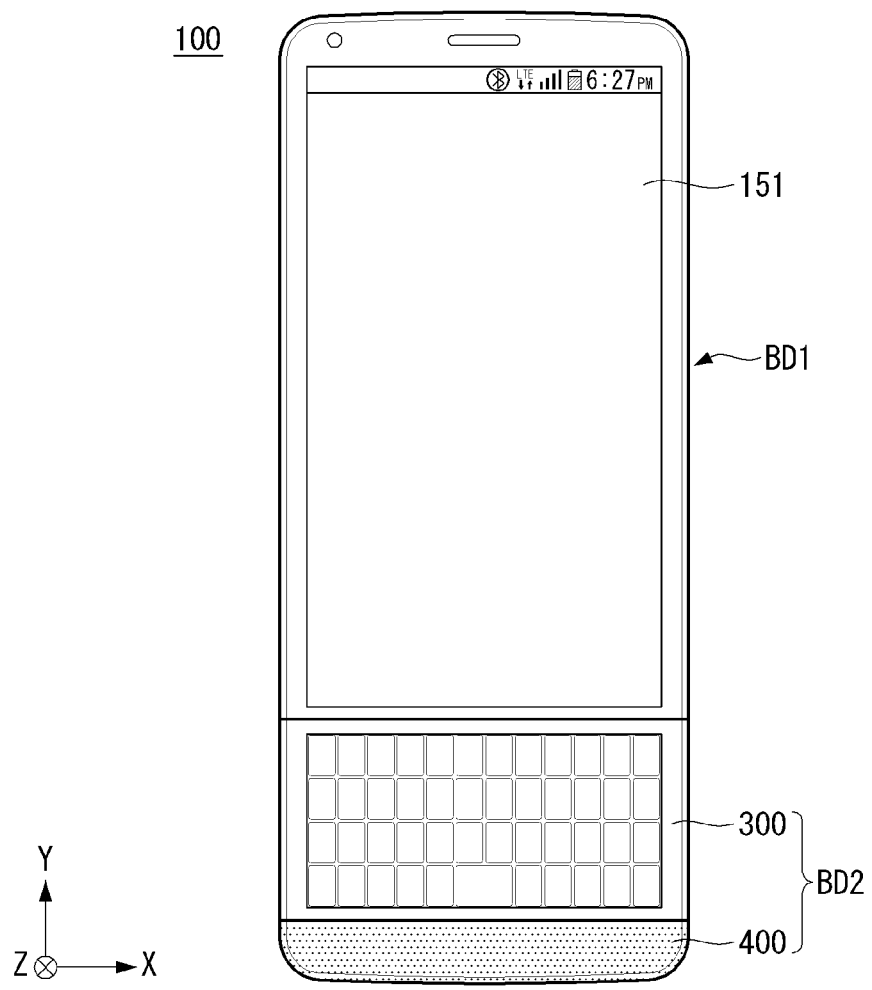
FIG. 20 illustrates a mobile terminal, in which a second module does not overlap a display, in accordance with an embodiment of the invention.
Figure 21:
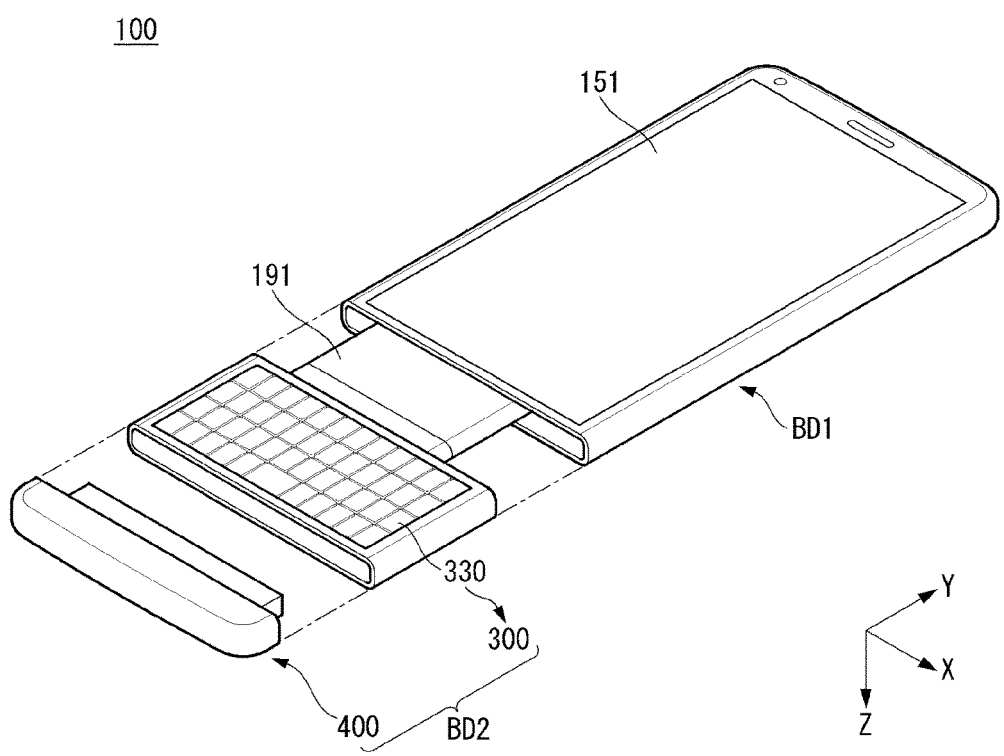
FIG. 21 illustrates coupling configuration of components of a mobile terminal shown in FIG. 20.

FIG. 20 illustrates the mobile terminal, in which the second module does not overlap the display, in accordance with the embodiment of the invention. FIG. 21 illustrates coupling configuration of components of the mobile terminal shown in FIG. 20. As shown in FIGS. 20 and 21, the second body BD2 may include a first module 400 and a second module 300.

The second module 300 may have a shape that is connected to the first body BD1 and is extended in a longitudinal direction of the first body BD1. As shown in FIG. 20, the second module 300 may not overlap the display 151 in a direction from the back surface to the front surface of the first body BD1. The display 151 may not have a portion that is covered by the second body BD2 in a state where the second body BD2 is coupled to the first body BD1. The entire portion of the display 151 may be exposed to the outside in a state where the second body BD2 is coupled to the first body BD1. The entire portion of the display 151 may be provided as a screen in a state where the second module 300 is coupled to the first body BD1.

When the second body BD2 is coupled to the first body BD1, the second module 300 may be positioned between the first body BD1 and the first module 400. The second module 300 may be connected to one side of the first body BD1. At least a portion of the second module 300 may be inserted into the hollow portion formed inside the first body BD1. The second module 300 may be coupled to the battery 191.

The second module 300 may include a keypad unit 330. The keypad unit 330 shown in FIG. 21 may not overlap the display 151 in the direction from the back surface to the front surface of the first body BD1. The keypad unit 330 may obtain the user input without passing through the touch sensor 143. The obtained user input may be transmitted to the controller 180. The keypad unit 330 shown in FIGS. 20 and 21 may have a different structure from the keypad unit 330 shown in FIGS. 14 and 15. For example, the keypad unit 330 may include key buttons 341 and a separate contact sensor positioned at a back surface of the key buttons 341.

The first module 400 may be connected to the second module 300. A portion of the first module 400 may be inserted into the second module 300. The first module 400 and the second module 300 may be formed as one body. The first module 400 may have a structure capable of being directly coupled to the first body BD1.

Figure 22:
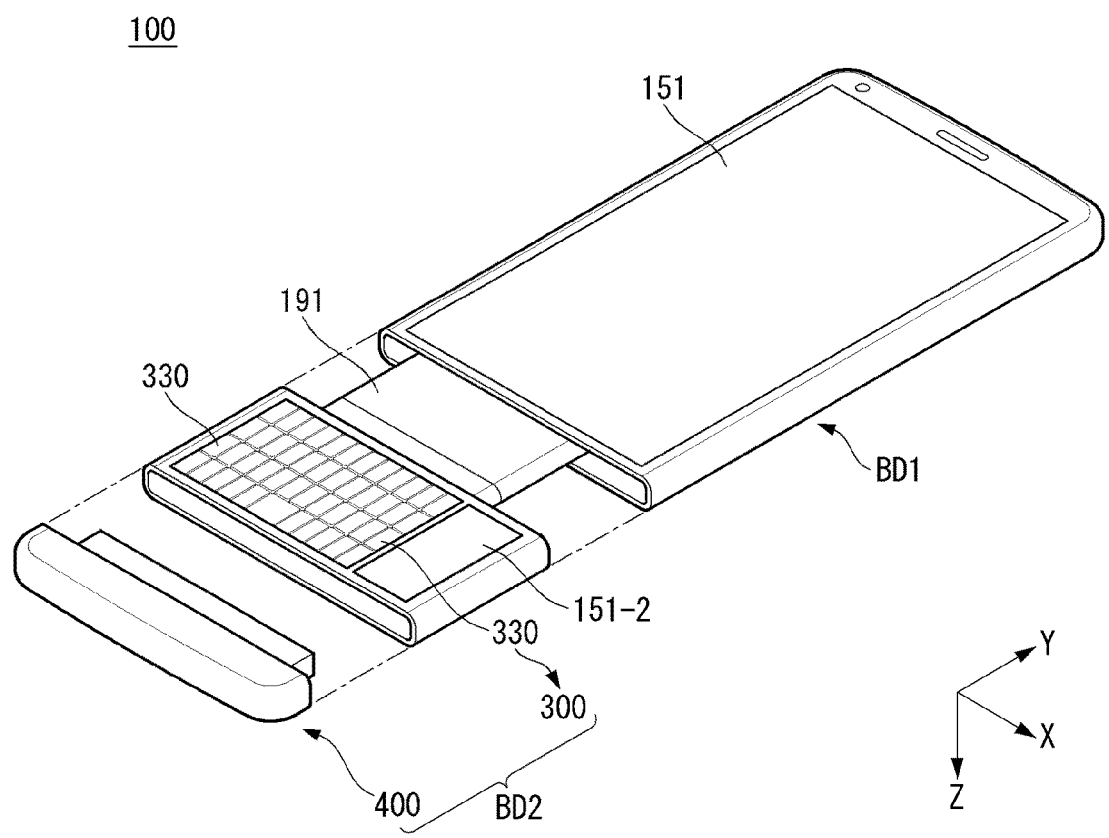
FIG. 22 illustrates a mobile terminal, in which a keypad unit and a second display are formed on the same surface, in accordance with an embodiment of the invention.

FIG. 22 illustrates the mobile terminal, in which a keypad unit and a second display are formed on the same surface, in accordance with the embodiment of the invention. A keypad unit 330 may include a second display 151-2.

The keypad unit 330 and the second display 151-2 may be formed on a front surface of a second module 300. The second display 151-2 may form a separate screen from the display 151. The second display 151-2 may be positioned adjacent to the keypad unit 330.

The second display 151-2 may obtain a touch input. The second display 151-2 may include a fingerprint recognition sensor for recognizing fingerprint information. The second display 151-2 may display contents different from contents displayed on the display 151.

The controller 180 may output first contents to the display 151 and output second contents to the second display 151-2. The second display 151-2 may display the first contents. The size and/or aspect ratio of the screen provided by the second display 151-2 may be different from those provided by the display 151. Or, the second contents may be different from first contents.

Figure 23:
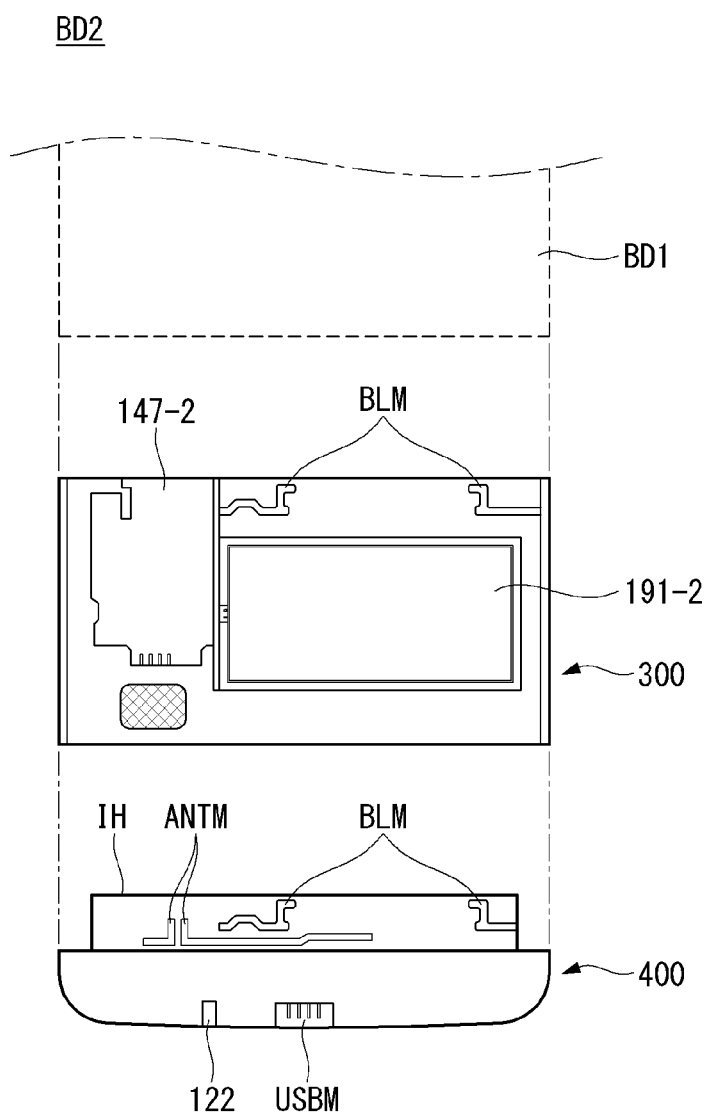
FIG. 23 is a rear view of a second body shown in FIG. 22.

FIG. 23 is a rear view of the second body shown in FIG. 22. More specifically, FIG. 23 illustrates the second body, in which a back portion of a case of a second module is removed. As shown in FIG. 23, the second body BD2 may include a first module 400 and a second module 300.

The second module 300 may include a second auxiliary circuit board 147-2, a battery locking module BLM, and a second battery 191-2.

The second auxiliary circuit board 147-2 may be electrically connected to the first body BD1 when the second module 300 is coupled to the first body BD1. The second auxiliary circuit board 147-2 may process an electrical signal. The second auxiliary circuit board 147-2 may transmit an input obtained from the second module 300 to the first body BD1. For example, an input obtained from the keypad unit 330 and/or the second display 151-2 may be transmitted to the first body BD1 via the second auxiliary circuit board 147-2.

The battery locking module BLM may be positioned on an upper side of the second module. The battery locking module BLM may be coupled to the battery 191. The second battery 191-2 may be positioned at one side of the second module 300. The second battery 191-2 may provide the electric power for the second body BD2 and/or the first body BD1.

The first module 400 may include the microphone 122, an USB module USBM, an antenna module ANTM, and a battery locking module BLM. The antenna module ANTM and the battery locking module BLM may be positioned at one side of the inner housing.

The antenna module ANTM may convert electrical signals into radio waves, and vice versa. The battery locking module BLM of the first module 400 may have a structure capable of being coupled to the battery 191. A structure for coupling the first module 400 to the first body BD1 may be substantially the same as a structure for coupling the first module 400 to the second module 300. In other words, the first module 400 may be coupled to the first body BD1.

Figure 24:
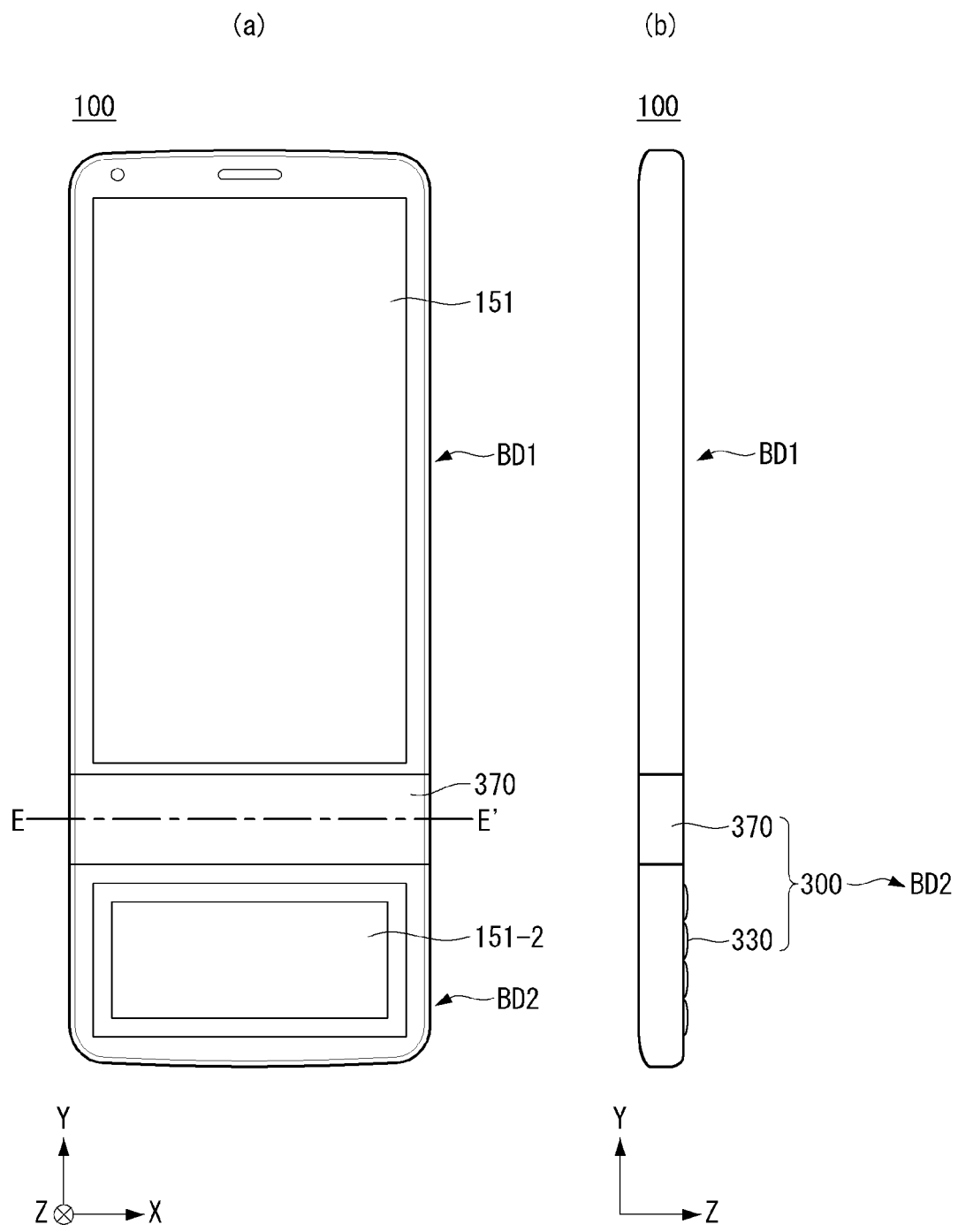
FIGS. 24 and 25 illustrate a mobile terminal, to which a foldable second module is coupled, in accordance with an embodiment of the invention.
Figure 25:
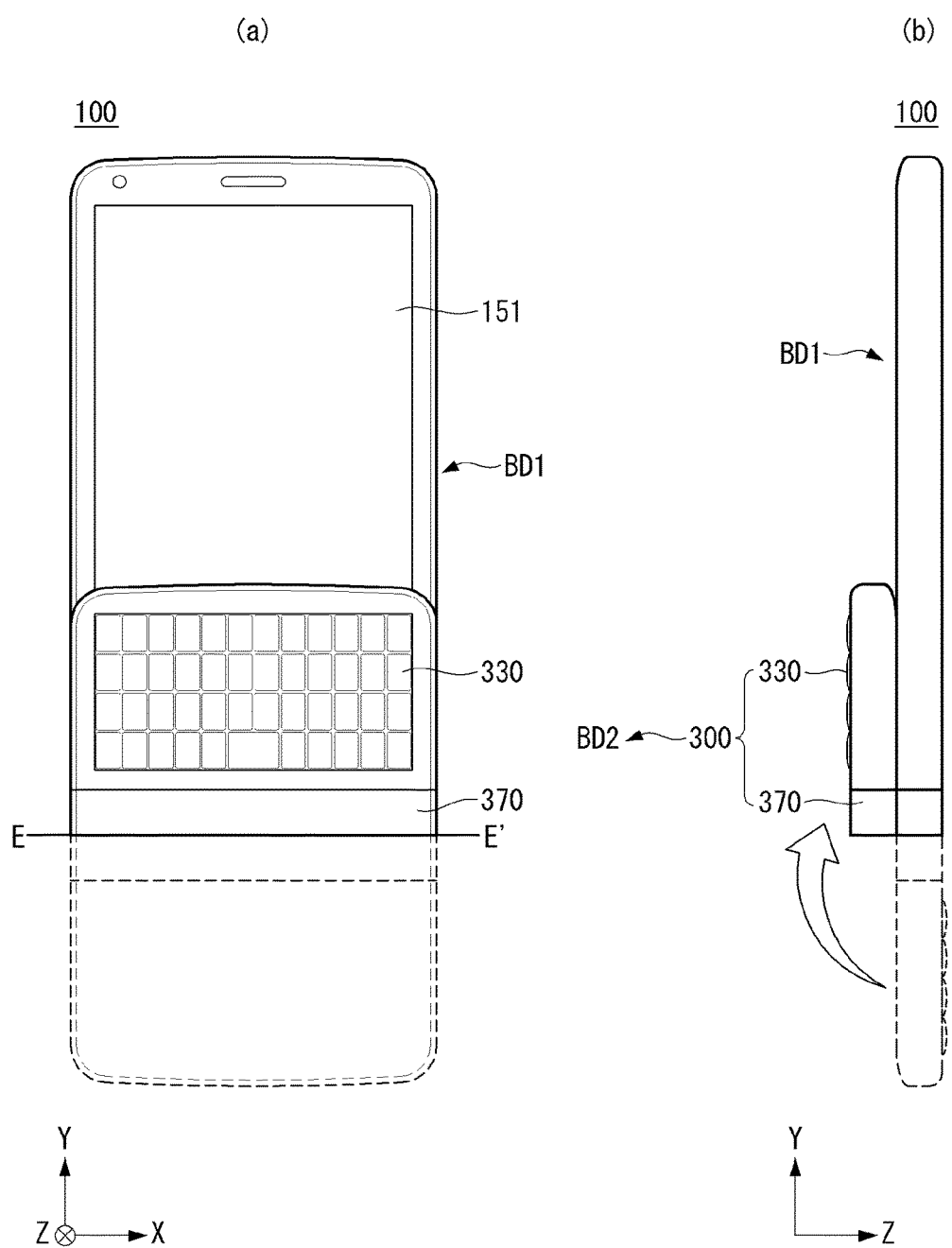

FIGS. 24 and 25 illustrate the mobile terminal, to which a foldable second module is coupled, in accordance with the embodiment of the invention.

As shown in (a) of FIG. 24, a second module 300 may include a second display 151-2. The second display 151-2 may be formed on a front surface of the second module 300.

The second display 151-2 may display the screen in a different manner from the display 151. The second display 151-2 may include a touch sensor receiving a touch input.

As shown in (b) of FIG. 24, the second module 300 may include a keypad unit 330. The keypad unit 330 may be positioned to face toward a direction different from the second display 151-2. The keypad unit 330 may be positioned on a surface different from the second display 151-2. For example, the keypad unit 330 may be formed on a back surface of the second module 300.

The second module 300 may include a folding portion 370. The folding portion 370 may be coupled to the first body BD1. The folding portion 370 may allow the second module 300 to be folded on the first body BD1.

FIG. 25 shows that the second module 300 is folded using the folding portion 370. More specifically, (a) of FIG. 25 is a front view of the mobile terminal 100, and (b) of FIG. 25 is a side view of the mobile terminal 100. In (a) of FIG. 25, E-E' indicates an outer boundary formed by folding the folding portion 370.

When the second module 300 is folded, the back surface of the second module 300 may be located in front of the mobile terminal 100. Further, when the second module 300 is folded, the keypad unit 330 may be positioned on the front surface of the mobile terminal 100 and may overlap the display 151.

As shown in FIG. 24, the user may receive the screen displayed on the second display 151-2 in a state where the second module 300 is not folded. As shown in FIG. 25, the user may provide a mechanical input (for example, a push input) to the mobile terminal 100 using the keypad unit 330 in a state where the second module 300 is folded.

Embodiments may be embodied in many different forms and should not be construed as being limited to embodiments set forth herein; rather, embodiments may be provided so that this disclosure will be thorough and complete, and will fully convey the concept to those skilled in the art.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
 a display;
 a first body including:
 a front case positioned at a rear of the display;
 a rear case, positioned at a rear of the front case, coupled to the front case; and
 an inner space, positioned between the front case and the rear case, formed at an end of the first body which is opened;
 a second body, coupled to a battery, coupled to the first body when at least a portion of the second body and the battery are inserted into the inner space through the end of the first body, including:
 a second module, including a keypad unit having a plurality of key buttons, at least a portion of the second module is overlapped with at least a portion of the display in front of the display when the second body is coupled to the first body.

2. The mobile terminal of claim 1, wherein the keypad unit includes:
 a first surface, on which the plurality of key buttons is positioned; and
 a second surface facing the display.

3. The mobile terminal of claim 2, wherein the keypad unit includes an impact absorbing member, wherein the impact absorbing member is positioned on the second surface and absorbs an impact.

4. The mobile terminal of claim 2, wherein the keypad unit includes a second display on at least one of the first surface and the second surface.

5. The mobile terminal of claim 4, further comprising a controller, inactivating at least a portion of an overlapped area of the display overlapped with the second module when the second module is coupled to the first body,
 wherein the controller is configured to output first contents to the display and output second contents to the second display.

6. The mobile terminal of claim 1, wherein the second module includes a second battery providing electric power.

7. The mobile terminal of claim 1, wherein the keypad unit includes:
 a first layer positioned on a back surface of each key button and having elasticity; and
 a second layer positioned on a back surface of the first layer and having different electrostatic capacities depending on changes in a shape of the second layer.

8. The mobile terminal of claim 1, further comprising a controller, inactivating at least a portion of an overlapped area of the display overlapped with the second module when the second module is coupled to the first body,
 wherein the first body includes a touch sensor, positioned on a back surface of the display, having an overlapped area overlapped with the second module when the second module is coupled to the first body, and
 wherein the controller inactivates a portion of the touch sensor when the second module is coupled to the first body, the portion of the touch sensor is outside of the overlapped area of the touch sensor.

9. The mobile terminal of claim 1, wherein the second body is connected to the first body so that the keypad unit faces toward a back surface of the first body.

10. The mobile terminal of claim 1, wherein the second body includes at least one of an antenna module, a microphone, or a USB module.

\* \* \* \* \*